United States Patent [19]

Sonobe et al.

[11] Patent Number: 5,208,652
[45] Date of Patent: May 4, 1993

[54] AN IMPROVED OPTICAL BRANCHING/COUPLING UNIT FOR AN OPTICAL FIBER GYROSCOPE, AND NAVIGATION SYSTEM EMPLOYING THE SAME

[75] Inventors: Hisao Sonobe, Katsuta; Shigeru Oho, Hitachi; Junichi Makino, Katsuta; Yasuhiro Gunji, Hitachi; Hiroshi Kajioka, Tsuchiura; Tatsuya Kumagai, Hitachi, all of Japan

[73] Assignees: Hitachi, Ltd.; Hitachi Cable Ltd., both of Tokyo, Japan

[21] Appl. No.: 691,977

[22] Filed: Apr. 26, 1991

[30] Foreign Application Priority Data

| Apr. 26, 1990 [JP] | Japan | 2-111204 |
| May 30, 1990 [JP] | Japan | 2-138489 |
| Jun. 4, 1990 [JP] | Japan | 2-145978 |

[51] Int. Cl.$^5$ .................................................. G01C 19/72
[52] U.S. Cl. ............................................ 356/350; 385/12
[58] Field of Search ...................... 356/350; 385/12, 14

[56] References Cited

U.S. PATENT DOCUMENTS

| 4,479,715 | 10/1984 | Sheem | 356/350 |
| 4,702,599 | 10/1987 | Moha | 356/350 |
| 4,915,503 | 4/1990 | Pavlath | 356/350 |

OTHER PUBLICATIONS

"Fiber Optic Rotation Sensor Laboratory Performance Evaluation", Goldstein et al, Optical Engineering Jul. 1979, pp. 381-383.

*Primary Examiner*—Samuel A. Turner
*Attorney, Agent, or Firm*—Antonelli, Terry, Stout & Kraus

[57] ABSTRACT

In an optical fiber gyroscope, the sensitivity thereof is optimized with a phase bias afforded by utilizing the phase characteristics of an optical branching/coupling unit. Further, the fluctuation of the intensity of a light source and the error and secular change of the phase characteristics of the optical branching/coupling unit are compensated by an electronic circuit. Moreover, an optical fiber loop is located in a heat insulation casing so as not to be affected by an ambient temperature change, thereby to prevent the drift of the optical fiber gyroscope attributed to an temperature change. Thus, the optical fiber gyroscope of high measurement accuracy is provided.

26 Claims, 12 Drawing Sheets

AN IMPROVED OPTICAL BRANCHING/COUPLING UNIT FOR AN OPTICAL FIBER GYROSCOPE, AND NAVIGATION SYSTEM EMPLOYING THE SAME

BACKGROUND OF THE INVENTION

The present invention relates to improvements in a small-sized optical fiber gyroscope wherein a distance, an azimuth, etc., are detected by utilizing an optical interference, and a navigation system wherein the optical fiber gyroscope is employed.

Heretofore, an optical fiber gyroscope which utilizes an optical interference for detecting an azimuth from the change of a rotating angular velocity has had its measurement based on the interference of two light waves which propagate in directions reverse to each other through an optical fiber loop. In other words, the rotating angular velocity is found by measuring the phase difference of interference light which is developed by rotations.

In measuring the phase difference by means of the optical fiber gyroscope in this manner, a phase bias needs to be given beforehand. As an expedient for affording the phase bias, there has been known a technique wherein, as stated in the official gazette of Japanese Patent Application Laid-open No. 135912/1983 or "Applied Optics", 20, (1981) pp. 4313-4318, the two light waves to form the interference light are once guided to separate optical paths and passed through phase plates in the optical fiber gyroscope, thereby to be endowed with the predetermined phase bias. Besides, for enhancing the detection accuracy of the optical fiber gyroscope, it is necessary to consider the influence of feedback light, the compensation of a drift attendant upon any change in the environment of the gyroscope, etc. In these regards, there have been known techniques disclosed in the official gazettes of Japanese Patent Applications Laid-open No. 94680/1981, No. 228113/1984, No. 134513/1990, etc.

SUMMARY OF THE INVENTION

An object of the present invention is to provide, in an optical fiber gyroscope, a construction which can afford a stable phase bias without splitting an optical path.

Another object of the present invention is to provide an optical fiber gyroscope in which the influence of light fed back from the optical system of an interferometer to a light source can be eliminated without reducing the average light quantity of the light source by half.

Still another object of the present invention is to provide an optical fiber gyroscope in which the ambient temperature is prevented from fluctuating.

Yet another object of the present invention is to realize a navigation system of high accuracy in such a way that, in using the aforementioned optical fiber gyroscope as the azimuth sensor of the navigation system for a moving object such as an automobile, an offset cancel command is given in accordance with the state of the moving object.

The present invention provides an optical fiber gyroscope for detecting a light phase difference between beams of light-to-interfere, characterized in that an optical branching/coupling unit in which the light phase difference between transmitted light and branched light is adjusted to a predetermined value is comprised as an optical element of an optical system.

In addition, the present invention provides an optical fiber gyroscope having means for affording a phase bias between beams of light-to-interfere, characterized in that said means for affording the phase bias between the beams of light-to-interfere is an optical branching/coupling unit which develops a predetermined light phase difference between transmitted light and branched light.

By the way, in the above optical fiber gyroscope, it is desirable that said optical branching/coupling unit develops the light phase difference which affords $\pi/2$ as the phase bias.

Besides, the present invention provides an optical fiber gyroscope having means for affording a phase bias of $\pi/2$ between beams of light-to-interfere in a ring interferometer, characterized by comprising an optical branching/coupling unit which develops a light phase difference affording $\pi/2$ as the phase bias, between transmitted light and branched light.

By the way, in a case where the above optical fiber gyroscope measures the light phase difference between the beams of light-to-interfere containing a light beam from a light source having passed through a different path, said optical fiber gyroscope should desirably comprise a further optical branching/coupling unit which is incoporated in said path, means for measuring an intensity of the branched light of said further optical branching/coupling unit, and means for controlling an intensity of a light source of said light system in accordance with the measured intensity of the branched light so as to keep constant a quantity of light entering said path.

In addition, the present invention provides an optical fiber gyroscope characterized by comprising an optical branching/coupling unit which develops between transmitted light and branched light a light phase difference affording such a phase bias that interference light assumes a peak value when a light phase difference between the beams of light-to-interfere corresponding to a physical quantity is 0 (zero), optical phase modulation means for affording a phase difference canceling the light phase difference corresponding to the physical quantity, between the beams of light-to-interfere within a pertinent phase modulation cycle, and means for driving said optical phase modulation means and for compensating an intensity fluctuation of the interference light by the use of the peak value of the interference light obtained.

Still further, the present invention provides an optical fiber gyroscope characterized by comprising an optical branching/coupling unit which develops between transmitted light and branched light a predetermined light phase difference affording a phase bias between the beams of light-to-interfere in a ring interferometer, and means for subjecting interference light which is formed of the beams of light-to-interfere endowed with the phase bias and which is derived from a terminal of said optical branching/coupling unit and feedback light of said ring interferometer which is derived from another terminal of said optical branching/coupling unit, to predetermined processing based on phase characteristics of said optical branching/coupling unit, and for generating a composite signal which varies as a sine function in correspondence with the phase difference of the beams of light-to-interfere in said ring interferometer.

Also, the present invention provides an optical branching/coupling unit characterized in that a path of transmitted light and a path of branched light are made structurally asymmetric.

Also, the present invention provides an optical branching/coupling unit characterized by including a plurality of optical fibers which have been melted and stretched under different stretching conditions.

Also, the present invention provides an optical branching/coupling unit characterized by including a plurality of polarization plane conserving fibers which give rise to different polarization modes of optical branching/coupling.

Further, the present invention provides an optical branching/coupling unit characterized by including an optical integrated circuit which has waveguide paths of transmitted light and branched light in asymmetric shapes as to widths, depths, figures etc.

By the way, in the above optical branching/coupling unit, it is desirable that an optical branching/coupling portion of said optical integrated circuit is provided with electrodes which serve to apply a voltage for adjusting a light phase difference between the transmitted light and the branched light.

In addition, the present invention provides an optical fiber gyroscope characterized by comprising any of the optical branching/coupling units described above.

Further, the present invention provides a fabrication apparatus for an optical fiber gyroscope having a ring interferometer, characterized by comprising fabrication means for fabricating an optical branching/coupling unit, observation means for observing in parallel with the fabrication of said optical branching/coupling unit, a frequency spectrum and a time-varying waveform of an interference output signal of said ring interferometer modulated by optical phase modulation means disposed in a ring-shaped optical path, and means for controlling said fabrication means in accordance with, desirably, a spectral amplitude ratio, a peak value of the time-varying waveform and an average value of the time-varying waveform as obtained with said observation means.

In the above fabrication apparatus, the present invention also provides a fabrication method for an optical fiber gyroscope characterized in that the second ring-shaped optical path which has a rotational path counter to the rotational path of light in said ring interferometer of said optical fiber gyroscope and which is equal in sensitivity to said ring interferometer is connected to said ring interferometer, thereby to suppress a phase difference which appears between beams of light-to-interfere in said ring interferometer due to a vibration or rotation.

By the way, using the modulated wave of said optical phase modulation means employed in the fabrication of said optical branching/coupling unit, a light phase difference corresponding to the physical quantity may well be detected in such a way that, in detecting the light phase difference, the interference-output electric signal of said ring interferometer is modulated by said optical phase modulation means, whereupon the frequency spectrum or time-varying waveform of the modulated interference-output electric signal of said ring interferometer is analyzed. That is, the modulation means employed in the fabrication can be utilized also for the detection of the light phase difference.

In addition, the present invention provides an optical fiber gyroscope employing a ring interferometer, characterized by comprising means for changing an oscillation state of a light source in a period shorter than a propagation delay time in which light emergent from said light source is fed back to said light source after propagating through a ring-shaped optical path of said ring interferometer.

Besides, the present invention provides an optical fiber gyroscope employing a ring interferometer, characterized by comprising means for bringing a light source into an oscillation suspension state for a moment in a period shorter than a propagation delay time in which light emergent from said light source is fed back to said light source after propagating through a ring-shaped optical path of said ring interferometer.

Further, the present invention consists in that an optical system in the prior art is furnished with means for turning "on" and "off" an optical output of a coherent light source or a driving source for a phase modulator, while a signal processing system is endowed with a function of detecting an offset value of its own and then correcting a signal value.

Moreover, the present invention consists in that an optical fiber loop is enveloped by a thermal buffer box so as to shut off transfer of heat.

Moreover, the present invention consists in that soft buffers are respectively interposed between a vibration type optical phase modulator and mounting portions for a vibratory portion of said vibration type optical phase modulator.

In case of applying the optical fiber gyroscope of the present invention to navigation, an offset cancel command is given by a main control device constituting a navigation system.

In operation, an optical branching/coupling unit turns part of incident light into transmitted light which is transmitted through the optical branching/coupling unit, while it turns another part into coupled light which is coupled to a waveguide path different from the propagation path of the incident light within the optical branching/coupling unit. The transmitted light and the coupled light have a certain phase difference which is determined by characteristics peculiar to the optical branching/coupling unit.

Therefore, when an optical branching/coupling unit has been installed in which the light phase difference between the transmitted light and the coupled light has been adjusted to a predetermined value, an optical fiber gyroscope endowed with any desired phase difference or phase bias is provided. Moreover, in this case, the phase difference or phase bias is afforded within the optical branching/coupling unit, so that the optical paths of two light waves to form interference light need not be separated. It is accordingly possible to attain the stable phase bias and to eliminate the influence of any disturbance on the optical fiber gyroscope.

In addition, when the optical branching/coupling unit is one by which the light phase difference affording $\pi/2$ as the phase bias is developed between the transmitted light and the coupled light, the interference light which varies in terms of a sine function in accordance with the phase difference based on a ring interferometer can be stably produced without disposing any special modulation means.

Further, in a case where means for controlling the intensity of a light source is disposed, the influences of the secular change etc. of the light source can be eliminated.

Moreover, a stabler measurement can be performed when the intensity fluctuation of the interference light is compensated using the peak value of interference light which does not depend upon the light phase difference between the beams of light-to-interfere corresponding to a physical quantity and which is produced by driving optical phase modulation means.

Besides, a composite signal which varies in terms of a sine function in correspondence with the phase difference of the beams of light-to-interfere in the ring interferometer can be generated for the optical branching/coupling unit having any desired phase characteristics, so that the phase characteristics of the optical branching/coupling unit can be endowed with some versatility at the stage of fabrication.

Besides, with the optical branching/coupling unit according to the present invention, the optical path of the transmitted light and that of branched light are asymmetric, so that a phase difference appears between the transmitted light and the branched light. With the optical branching/coupling unit, therefore, the phase bias can be stably afforded between the beams of light-to-interfere without additionally installing modulation means or the like.

Besides, with a fabrication apparatus for an optical fiber gyroscope having a ring interferometer according to the present invention, an optical branching/coupling unit can be fabricated while the frequency spectrum and time-varying waveform of the interference output signal of the ring interferometer modulated by optical phase modulation means incorporated in a ring-shaped optical path are being observed. Therefore, an optical branching/coupling unit can be fabricated which has phase characteristics, a branching ratio and a loss as desired.

Besides, with a fabrication method according to the present invention, a phase difference which is equal in magnitude and reverse in direction to the phase difference between the beams of light-to-interfere appearing in the ring interferometer is developed by the second ring-shaped optical path, so that the appearance of the phase difference between the beams of light-to-interfere in the ring interferometer, attributed to disturbances during fabrication such as a vibration and a rotation, can be suppressed.

Besides, the oscillation state of a light source is changed in a period shorter than a propagation delay time, whereby any coherent influence is not involved even when feedback light returns during the oscillation of the light source.

More specifically, many of the phenomena of the light source, such as astable oscillation and intensity modulation, are problems relevant to the coherence of the light source. Herein, changing the oscillation state of the light source is equivalent to the projection of light from another light source, so that the phenomena ascribable to the coherence of the light source does not take place.

Further, such interruption of the coherence can be realized by suspending the oscillation of the light source for a moment. Accordingly, the light source is brought into an oscillation suspension state for a moment in the period shorter than the propagation delay time, thereby to eliminate the coherent influence ascribable to the feedback light and to minimize the loss of the average light quantity of the interference light.

Further, in order to prevent the influence of the change of an ambient temperature, an optical fiber loop is received in a thermal buffer box which is a sealed box having a multilayer structure made of a heat insulator and a thermal conductor. Thus, even when the ambient temperature has changed locally and suddenly, the change of a heat quantity imposed on the optical fiber loop is very slight owing to the low thermal conductivity of the heat insulator and the large heat capacity of the thermal conductor, so that the temperature change becomes slow. Besides, since the thermal conductivity of the thermal conductor is high, a uniform temperature distribution is attained.

As a result, the respective optical path lengths of two light waves passing through the optical fiber loop in directions reverse to each other become quite equal, and the drift of an optical fiber gyroscope can be prevented from occurring.

Moreover, in a case where a vibration type optical phase modulator is mounted through flexible buffers, it can vibrate freely, and hence, a satisfactory modulation degree is attained. Besides, any modulation distortion can be prevented from occurring.

As a result, the undesirable drift of the optical fiber gyroscope can be prevented from occurring.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

Figure 1:
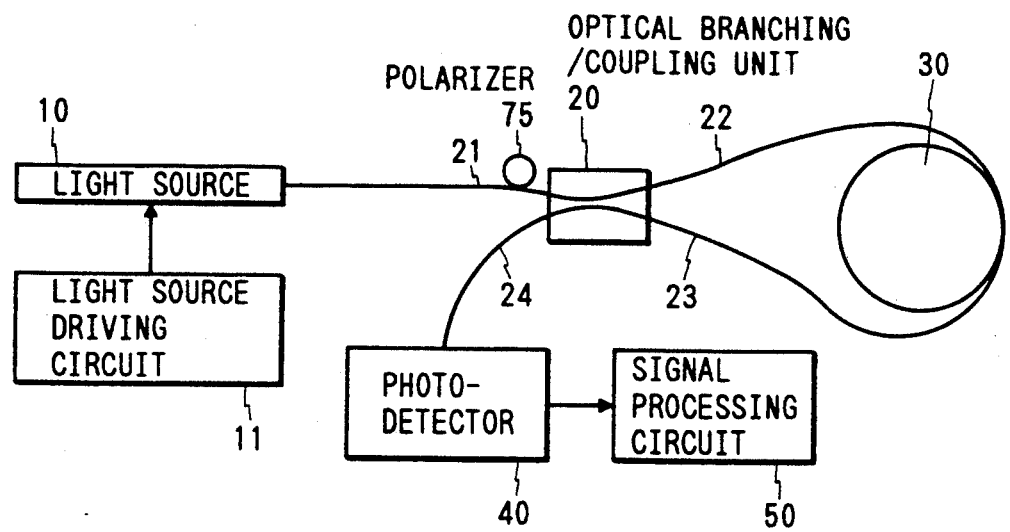
FIG. 1 shows the first embodiment of an optical fiber gyroscope according to the present invention.

Now, an embodiment of an optical fiber gyroscope according to the present invention will be described with reference to FIG. 1.

Referring to the figure, numeral 10 designates a coherent light source, numeral 11 a light source driving circuit, numeral 20 an optical branching/coupling unit, numeral 30 an optical fiber loop, numeral 40 a photodetector, and numeral 50 a signal processing circuit.

In the embodiment of FIG. 1, the coherent light source 10 is driven by the light source driving circuit 11.

Light from the coherent light source 10 is guided to the first terminal 21 of the optical branching/coupling unit 20. The light having entered the optical branching/coupling unit 20 via the terminal 21 is bifurcated in this unit, and the resulting light beams emerge from the second terminal 22 and the third terminal 23, respectively.

The first light beam which is the emergent light beam from the second terminal 22 is light transmitted through the optical branching/coupling unit 20, while the second light beam which is the emergent light beam from the third terminal 23 is light coupled in the optical branching/coupling unit 20. The phase difference between the first and second light beams is determined by the phase characteristics of the optical branching/coupling unit 20. In this embodiment, the optical branching/coupling unit 20 is designed and fabricated so as to afford 45° as the phase difference.

The first and second light beams enter both the ends of the optical fiber loop 30, respectively, and they propagate in directions reverse to each other through the optical fiber loop 30. Thereafter, the first light beam reaches the terminal 23, while the second light beam reaches the terminal 22.

Accordingly, both the light beams enter the optical branching/coupling unit 20 again via the opposite terminals, respectively.

The first light beam having entered the optical branching/coupling unit 20 via the third terminal 23 is bifurcated in this unit into the fourth light beam which is transmitted light to emerge from the fourth terminal 24, and the fifth light beam which is coupled light to emerge from the first terminal 21.

On the other hand, the second light beam having entered the optical branching/coupling unit 20 via the second terminal 22 is similarly bifurcated in this unit into the sixth light beam which is transmitted light to emerge from the first terminal 21, and the seventh light beam which is coupled light to emerge from the fourth terminal 24.

The fourth and seventh light beams emergent from the terminal 24 form interference light, which is detected by the photodetector 40. On the other hand, the fifth and sixth light beams emergent from the terminal 21 are fed back to the coherent light source 10.

Here, the optical branching/coupling unit 20 used in this embodiment is a symmetric reciprocal transducer wherein, whichever terminal the light beam enters this unit via, the phase difference between the transmitted and coupled light beams is equal and is 45° in this case.

In the propagation process of the light stated above, the phase difference between the fourth and seventh light beams constituting the interference light will be investigated. The fourth light beam has been transmitted through the optical branching/coupling unit 20 twice, while the seventh light beam has been coupled in the optical branching/coupling unit 20 twice.

Accordingly, the total phase difference of the fourth and seventh light beams based on the optical branching/coupling unit 20 is 45°×2=90° in the case of this embodiment.

When the whole optical system is rotating, a phase difference $\phi_s$ owing to the Sagnac effect is added to the aforementioned phase difference 90°, and the phase difference of the interference light becomes:

$$(\phi_s + 90°)$$

in all.

Meanwhile, letting $\phi_s$ denote a phase difference to-be-measured and letting I and $\nu$ denote the intensity and visibility of interference light, respectively, the output signal P of an optical interference sensor is generally expressed by Eq. (1):

$$P = KI\{1 + \nu\cos\phi_s\} \quad (1)$$

where K denotes a constant. Thus the output signal P responds to the variation of the phase difference to-be-measured $\phi_s$ in terms of a cosine function.

In the vicinity of $\phi_s = 0$, accordingly, the sensitivity of the optical interference sensor lowers drastically, and the detection of a low rotational angular velocity becomes difficult in the case of the optical fiber gyroscope.

It is therefore favorable for the detection of the very small phase difference $\phi_s$ to bias the phase difference of the optical interference sensor by any means so that the output signal P of the optical interference sensor may vary as a sine function in response to the phase difference to-be-measured $\phi_s$ as indicated by Eq. (2):

$$\begin{aligned} P &= KI\{1 + \nu\cos(\phi_s + 90°)\} \\ &= KI\{1 + \nu\sin\phi_s\} \end{aligned} \quad (2)$$

Herein, according to the optical fiber gyroscope of this embodiment, the phase bias of 90° can be afforded without especially installing a phase modulator, as described before, and an interference signal P which is delivered as the output of the photodetector 40 varies versus the phase difference $\phi_s$ in terms of the sine function as indicated by Eq. (2).

That is, the optimum sensitivity is achieved.

Further, here will be explained the phase difference between the fifth and sixth light beams which form the feedback light to the coherent light source 10.

Each of these light beams has been transmitted through the optical branching/coupling unit 20 once and coupled therein once. It is accordingly understood that both the light beams have no phase difference caused by the propagation through the optical branching/coupling unit 20. That is, when the feedback light is handled as interference light, it is always in a cosine function with respect to the phase difference $\phi_s$. This fact is utilized in the fourth embodiment of the present invention to be described later.

In FIG. 1, the signal processing circuit 50 receives as its input the interference signal of the photodetector 40 varying as the sine function versus the phase difference $\phi_s$, and it delivers as its output a rectilinear signal voltage concerning the phase difference $\phi_s$ through the calculation of an inverse sine function.

By the way, in a case where polarized light fluctuates in the optical system, a drift is sometimes involved in the measured value of the phase difference to-be-measured $\phi_s$ because of a change in the interference state of the interferometer. For the purpose of eliminating the evil effect of the polarization fluctuation, it is desirable to insert a polarizer/polarizers 75 between the light source 10 and the first terminal 21 of the optical branching/coupling unit 20 or/and between the fourth terminal 24 of the optical branching/coupling unit 20 and the photodetector 40.

Meanwhile, in the case of the first embodiment described above, when the quantity of light from the coherent light source 10 changes, the quantity of light received by the photodetector 40 (the intensity I in Eq. (2)) fluctuates immediately.

On the other hand, in the interference sensor employing an optical fiber, the quantity of light sometimes fluctuates due to the temperature change, the secular change or the like of the coupling efficiency between the light source and the optical fiber.

Accordingly, the first embodiment can pose the problem that the proportionality coefficient between the output voltage and input phase difference $\phi_s$ of the signal processing circuit 50, in other words, the voltage scale thereof changes depending upon the the quantity of light entering the photodetector 40.

The second and third embodiments of the present invention to be described below compensate the fluctuation of the voltage scale in the first embodiment.

Now, the second embodiment of the present invention will be described.

Figure 2:
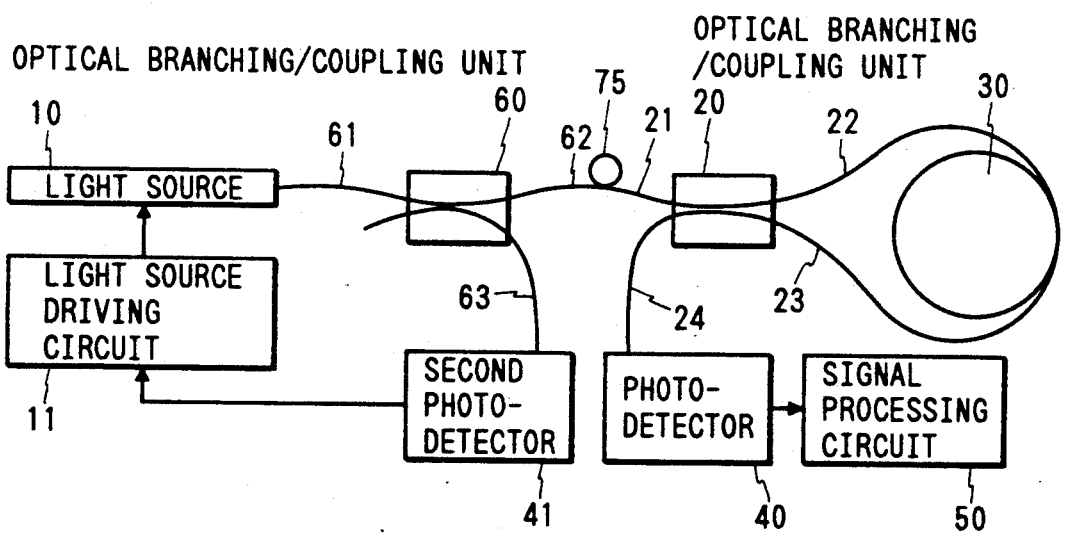
FIG. 2 shows the second embodiment of the optical fiber gyroscope of the present invention.

FIG. 2 shows the construction of an optical fiber gyroscope according to the second embodiment.

In the interference sensor employing the optical fiber, the most important factor of the fluctuation of the light quantity is usually the temperature or secular change of the coupling efficiency between the light source and the optical fiber.

In the second embodiment, therefore, a second optical branching/coupling unit 60 and a second photodetector 41 are disposed in addition to the first embodiment as illustrated in FIG. 2.

Referring to FIG. 2, light from the coherent light source 10 enters the optical branching/coupling unit 60 via the first terminal 61 thereof, and it is bifurcated to emerge from the second terminal 62 and third terminal 63.

The second photodetector 41 receives light from the terminal 63, and it adjusts and controls the light source driving circuit 11 so as to keep the quantity of this light constant. As a result, output light from the second terminal 62 of the second optical branching/coupling unit 60 is also held at a constant light quantity.

The output light from the terminal 62 is guided to the first optical branching/coupling unit 20. The subsequent operation is quite the same as in the first embodiment.

As stated above, in the second embodiment, the light quantity is stabilized, so that the voltage scale does not fluctuate.

By the way, as in the first embodiment, it is desirable in the second embodiment to insert the polarizer/polarizers 75 between the second terminal 62 of the optical branching/coupling unit 60 and the first terminal 21 of the optical branching/coupling unit 20 or/and between the fourth terminal 24 of the optical branching/coupling unit 20 and the photodetector 40.

Now, the third embodiment of the present invention will be described.

Figure 3:
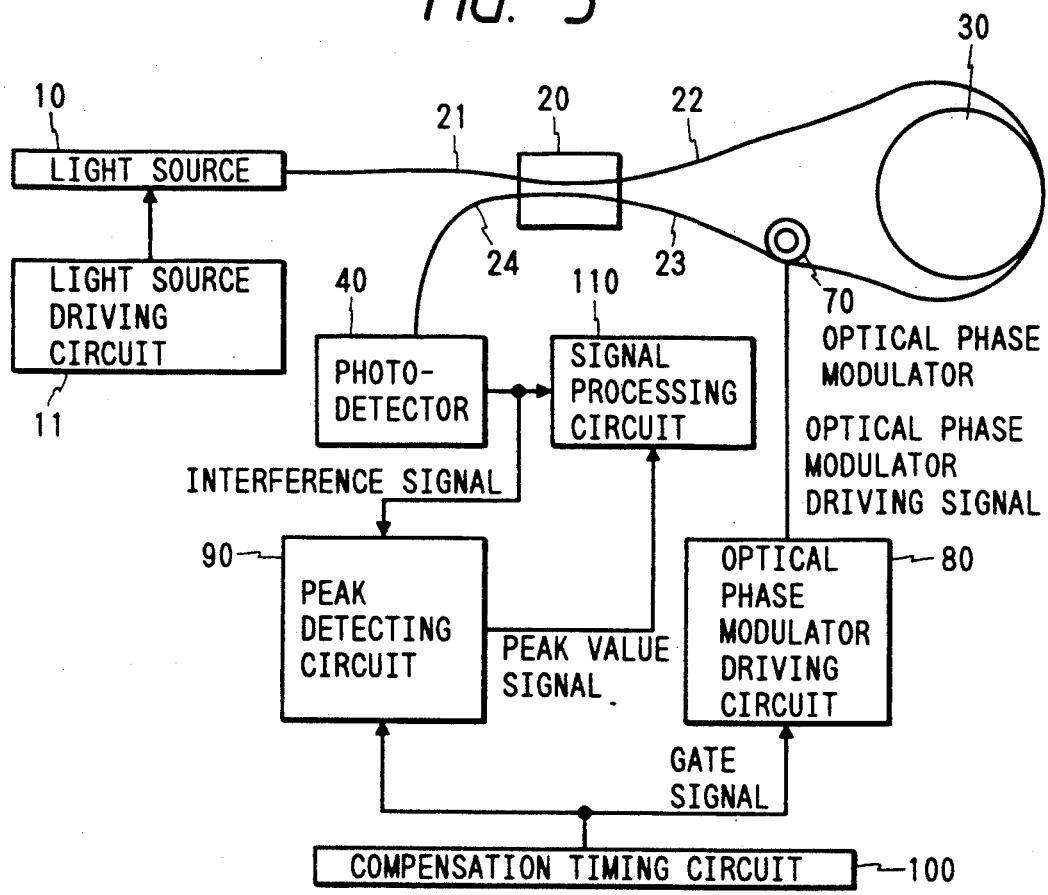
FIG. 3 shows the third embodiment of the optical fiber gyroscope of the present invention.

FIG. 3 shows the construction of an optical fiber gyroscope according to the third embodiment.

The third embodiment is such that the fluctuation of the voltage scale is compensated by an expedient different from the expedient of the second embodiment.

In the third embodiment, the first embodiment is additionally furnished with an optical phase modulator 70 which is fabricated by winding an optical fiber about 1 meter long round a PZT (piezoelectric transducer or piezo-ceramic) cylinder and which is incorporated at one end of the optical fiber loop 30.

With the optical fiber gyroscope in FIG. 3, when the temporal change of a light phase based on the optical phase modulator 70 is denoted by $\psi(t)$, an interference signal P(t) which is delivered as the output of the photodetector 40 is expressed by Eq. (3):

$$P(t) = K \{I + \nu \sin (\phi_s + \psi(t) + \psi(t-\tau))\} \quad (3)$$

Here, $\tau$ denotes the propagation delay time of the light wave attributed to the fiber loop, and it is given by Eq. (4) by the use of the length l of the fiber loop, the refractive index n of the optical fiber and the velocity c of light:

$$\tau = n \, l/c \quad (4)$$

Here, it is the same as in the first embodiment that, since the interferometer undergoes the phase bias of 90° owing to the phase characteristics of the optical branching/coupling unit 20, the interference signal P(t) is in a sine function with respect to the phase difference $\phi_s$.

It is now assumed that the optical phase modulator 70 is driven with a sinusoidal wave signal expressed by Eq. (5):

$$\psi(t) = \psi_\mu \sin \omega_\mu t \quad (5)$$

Here, $\psi_\mu$ denotes the amplitude of optical phase modulation, and $\omega_\mu$ the angular frequency of the optical phase modulation. On this occasion, the interference signal P(t) is expressed by Eqs. (6) and (7):

$$P(t) = K I \{1 + \nu \sin (\phi_s + \eta \cos \omega_\mu(t-\tau/2))\} \quad (6)$$

$$\eta = 2 \psi_\mu \sin (\omega_\mu \tau/2) \quad (7)$$

Accordingly, when the optical phase modulation amplitude $\psi_\mu$ is set so as to render the effective phase modulation index $\eta$ sufficiently large, a certain time $t_0$ can exist to satisfy Eq. (8) in correspondence with any desired phase difference $\phi_s$:

$$\phi_s + \eta \cos \omega_\mu(t_0-\tau/2) = \pi/2 \quad (8)$$

On this occasion, Eq. (9) holds:

$$P_{PEAK} = P(t_0) = K I \{1 + \nu\} \quad (9)$$

Thus, the interference signal P(t) becomes its peak value at the time $t_0$.

As understood from Eq. (9), the peak value $P_{PEAK}$ of the interference signal does not depend upon the phase difference $\phi_s$.

With note taken of this fact, the third embodiment compensates the voltage scale fluctuation in the first embodiment.

In FIG. 3, an optical phase modulator driving circuit 80 and a peak detecting circuit 90 are operated in accordance with a gate signal which is generated by a compensation timing circuit 100.

Figure 4:
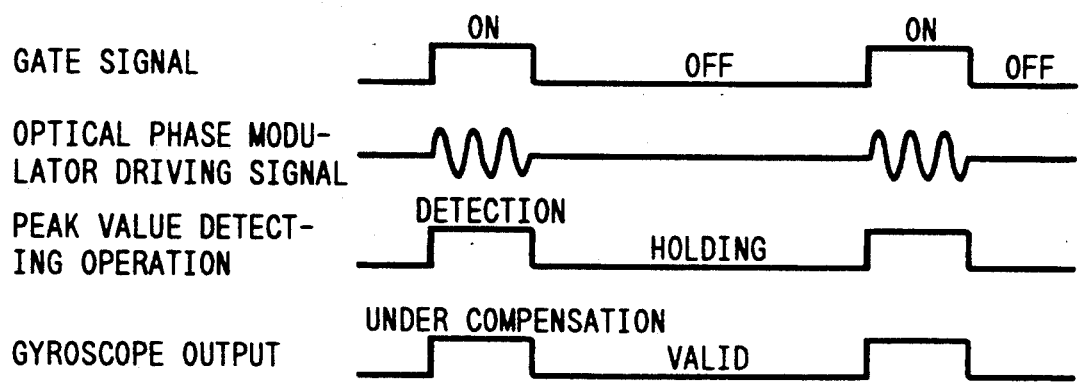
FIG. 4 is a diagram for explaining the operation of the third embodiment.

More specifically, as illustrated in FIG. 4, the optical phase modulator driving circuit 80 drives the optical phase modulator 70 only when the gate signal is in its ON state, and the peak detecting circuit 90 detects the peak of the interference signal at this time.

When the gate signal is OFF, the optical phase modulator driving circuit 80 stops operating.

Besides, while the gate signal is OFF, the peak detecting circuit 90 holds the peak value detected before and continues to deliver it as a peak value signal. Meantime, a signal processing circuit 110 is supplied as inputs with the interference signal and the peak value signal, the ratio of which is calculated and delivered as an output.

That is, while the gate signal is OFF, the interference signal is:

$$P(t) = K I \{1 + v \sin \phi_s\} \quad (10)$$

similarly to that of the first embodiment. This interference signal is divided by the peak value signal obtained when the gate signal is ON:

$$P_{PEAK} = K I \{1 + v\} \quad (11)$$

Thus, the interference light intensity I is removed, so that the output of the signal processing circuit 110 becomes regardless of the change of the quantity of the coherent light.

The ON time of the gate signal is set at about 10 ms. in this embodiment in consideration of the response characteristics of the optical phase modulator of PZT.

The OFF time may be sufficiently long for the compensation of a slow fluctuation, and the gate signal is turned ON repeatedly at a period of 1 second in this embodiment.

Also in the third embodiment, it is desirable to employ the polarizer(s) likewise to the first embodiment.

Now, the fourth embodiment of the present invention will be described.

In the first embodiment of the present invention, the phase characteristics of the optical branching/coupling unit are set at 45°. In the fabrication of the optical branching/coupling unit, however, it is sometimes difficult to set the phase characteristics exactly at the predetermined value. Also, fluctuation in the phase characteristics of the optical branching/coupling unit can occur in a long term.

Therefore, the fourth embodiment solves this problem.

Figure 5:
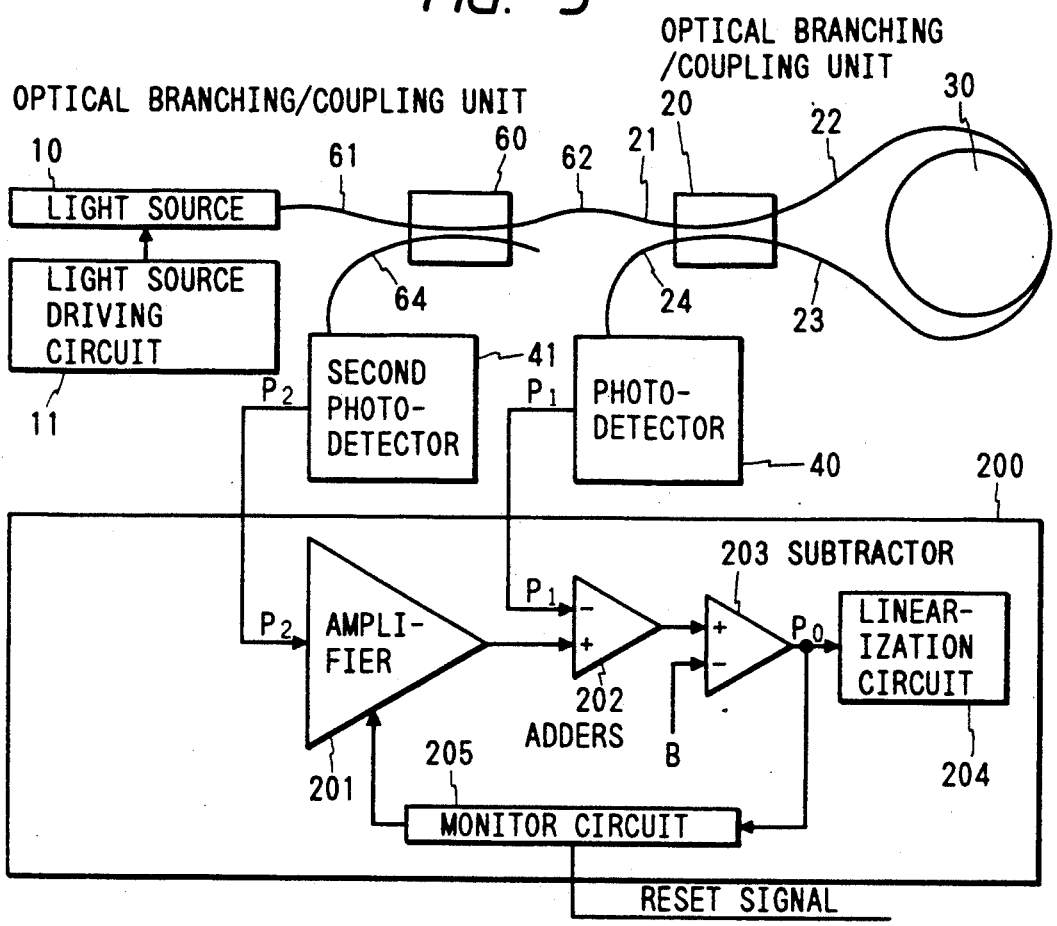
FIG. 5 shows the fourth embodiment of the optical fiber gyroscope of the present invention.

FIG. 5 shows the construction of an optical fiber gyroscope according to the fourth embodiment.

As illustrated in the figure, likewise to the second embodiment, the fourth embodiment is so constructed that the second optical branching/coupling unit 60 is inserted between the coherent light source 10 and the first optical branching/coupling unit 20, in addition to the first embodiment. Unlike the second embodiment, however, the second photodetector 41 is connected to the fourth terminal 64 of the second optical branching/coupling unit 60.

Besides, a signal processing circuit 200 comprises a variable-gain amplifier 201 of gain A, adders/subtracters 202, 203 and a linearization circuit 204.

Further, the phase characteristics of the first optical branching/coupling unit 20 have any desired value $\alpha$ and need not be exactly 45° as in the first, second or third embodiment.

As understood from the detailed description of the first embodiment, the phase difference of interference light which emerges from the terminal 24 of the optical branching/coupling unit 20 is $2\alpha$ in the fourth embodiment. The first interference signal $P_1$ which is delivered from the first photodetector 40 is expressed by Eq. (12):

$$\begin{aligned} P_1 &= K I \{1 + v \cos(\phi_s + 2\alpha)\} \\ &= K I \{1 + v \cos 2\alpha \cdot \cos \phi_s - v \sin 2\alpha \cdot \sin \phi_s\} \end{aligned} \quad (12)$$

On the other hand, emergent light from the terminal 64 of the second optical branching/coupling unit 60 is part of the feedback light to the coherent light source 10 as has emerged from the terminal 21 of the first optical branching/coupling unit 20. As referred to in the description of the first embodiment, this emergent light is the interference light which is always in the cosine function irrespective of the phase characteristics of the first optical branching/coupling unit 20.

Accordingly, the second interference signal $P_2$ which is delivered from the second photodetector 41 becomes as indicated by Eq. (13):

$$P_2 = L I \{1 + v \cos \phi_s\} \quad (13)$$

Here, L denotes a constant which is determined by the branching characteristics of the second optical branching/coupling unit 60 and the gain of the second photodetector 41.

With the fourth embodiment, the first and second interference signals $P_1$, $P_2$ are noticed and are electrically composed, thereby to produce an optical fiber gyroscope output which varies in a sine function with respect to the phase difference $\phi_s$ in the same manner as in the bestowal of the 90° phase bias.

More specifically, in the signal processing circuit 200, one input signal B of the adder/subtracter 203 serves to adjust a D.C. bias level, and the output signal $P_o$ thereof is expressed by Eq. (14):

$$P_o = A P_2 - P_1 - B \quad (14)$$

Accordingly, when the gain A of the variable-gain amplifier 201 is set as indicated by Eq. (15):

$$A = K \cos 2\alpha / L \quad (15)$$

the output signal $P_o$ is expressed by Eq. (16):

$$P_o = K I v \sin 2\alpha \cdot \sin \phi_s + (AL - K) I - B \quad (16)$$

Thus, the output signal with which the sensitivity of the optical fiber gyroscope is optimalized with respect to the phase difference $\phi_s$ is produced.

Besides, when the D.C. bias B is set as indicated by Eq. (17) here:

$$B = (AL - K) I \quad (17)$$

the output signal becomes $P_o=0$ for the phase difference $\phi_s=0$.

If the phase characteristics $\alpha$ of the optical branching/coupling unit 20 are sufficiently stable, the gain constant A may be set by adjusting it only at the stage of the fabrication of the optical fiber gyroscope. However, in a case where the phase characteristics $\alpha$ fluctuate to the extent of posing a problem in practical use, the constant A needs to be set again.

In the fourth embodiment, the gain constant A of the variable-gain amplifier 201 is occasionally adjusted. A monitor circuit 205 is disposed for this purpose, and in response to a reset signal input externally applied, it adjusts the gain constant A so that the output signal $P_o$ of the adder/subtracter 203 may agree with a predetermined value.

The fourth embodiment shall be supplied with the reset signal only at the point of time at which a moving object or the like carrying the optical fiber gyroscope thereon is not rotating, so the Sagnac phase difference $\phi_s=0$ may be deemed.

At this time, the monitor circuit 205 resets the gain constant A and further the D.C. bias B so as to establish:

$$P_o(\phi_s=0)=0 \qquad (18)$$

thereby to compensate the fluctuation of the phase characteristics $\alpha$ of the optical branching/coupling unit 20.

By the way, also in the fourth embodiment, it is desirable to employ the polarizer(s) likewise to the second embodiment.

Next, there will be described methods of fabricating the optical branching/coupling units for use in the interference sensors according to the foregoing embodiments.

Optical branching/coupling units for use in optical fiber systems are classified into a fiber coupler obtained by working optical fibers, and a waveguide type optical branching/coupling unit based on an optical integrated circuit.

The two processes of fusion stretching and side lapping are typical as the fabricating method for the fiber coupler, and the waveguide type optical branching/coupling unit includes the two types of a directional coupler and a Y-brancher.

The optical branching/coupling units according to the above embodiments have the feature that the phase characteristics thereof are set at the predetermined value.

In embodiments to be described below, such optical branching/coupling units and the fabricating methods thereof will be clarified.

The characteristics of an optical branching/coupling unit are elucidated by the theory of mode coupling. Heretofore, the phase characteristics of the optical branching/coupling unit have been always 90° under the condition that two light propagation paths are synchronous, i.e., that they have equal propagation constants.

Accordingly, the optical branching/coupling unit exhibiting any desired phase characteristics must have a difference between the propagation constants of the two light propagation paths thereof, and the two light propagation paths must be asymmetric for that purpose.

In the fifth-seventh embodiments of the present invention to be stated below, such asynchronous optical branching/coupling units will be referred to.

Now, the fifth embodiment of the present invention will be described.

Figure 6:
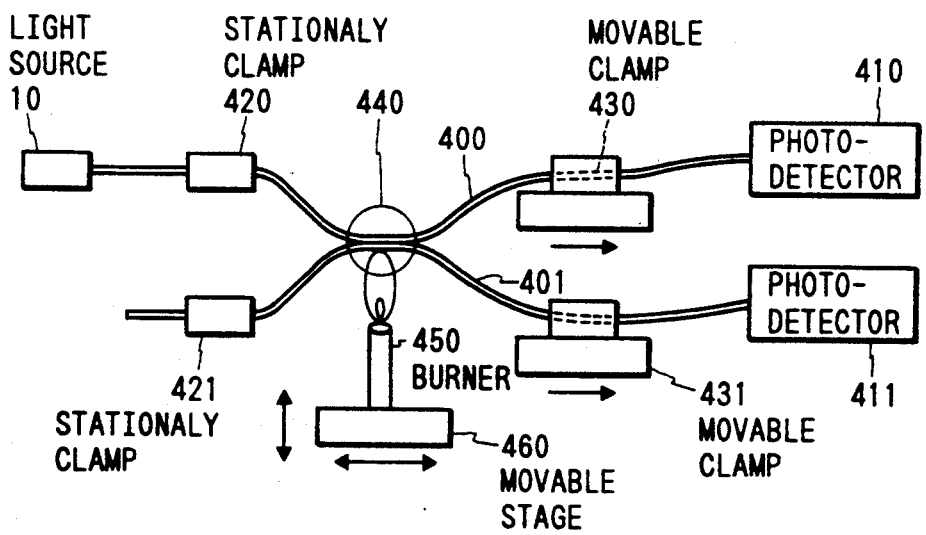
FIG. 6 shows an example of a method of fabricating an optical branching/coupling unit according to the present invention.

FIG. 6 illustrates a fabrication method for the optical branching/coupling unit according to this embodiment.

The optical branching/coupling unit according to this embodiment is fabricated by the fusion stretching process.

Referring to the figure, light from a light source 10 is caused to enter the first optical fiber 400, and emergent light from the first optical fiber 400 is detected by the first photodetector 410.

The first optical fiber 400 is supported by a stationary clamp 420 and a movable clamp 430.

On the other hand, the second optical fiber 401 is structurally identical to the first optical fiber 400, and it is similarly supported by a stationary clamp 421 and a movable clamp 431.

The light from the light source 10 is coupled to the second optical fiber 401 in a fusion stretching portion 440, and the coupled light is detected by the second photodetector 411.

A burner 450 is supported on a movable stage 460, and the melted state of the fusion stretching portion 440 is controlled by moving the movable stage 460 vertically and horizontally.

In the fusion stretching process, photocoupling is achieved in such a way that the claddings of the two optical fibers are brought into contact and are unitarily melted by heating with the burner until the cores of the two optical fibers come into close proximity. For the realization of the proximate state of the cores, it is common practice that, under the melted state of the fusion stretching portion 440, the cores of the two optical fibers 400, 401 are pressed toward each other, whereupon the movable clamps 430, 431 are moved axially of the optical fibers, thereby to stretch these optical fibers.

On this occasion, the output intensities of the photodetectors 410, 411 are compared so as to attain a desired branching ratio.

The fifth embodiment of the present invention realizes the asynchronous optical branching/coupling unit in such a way that, during the fusion stretching stated above, the first optical fiber 400 and the second optical fiber 401 are stretched under different stretching conditions.

As shown in FIG. 6, in this embodiment, the movable clamps 430, 431 for stretching the first and second optical fibers 400, 401 are individually disposed and are separately moved, thereby to perform asymmetric stretching. In the fusion stretching portion 440, the optical fibers are melted and stretched and therefore have their propagation constants changed. Herein, since the stretch amounts of the first and second optical fibers are different, a difference in the propagation constants arises in the fusion stretching portion 440.

Incidentally, when means for measuring the phase characteristics and branching ratio of an optical branching/coupling unit according to the eighth embodiment to be described later is conjointly used in the fabricating process for the fiber coupler based on the fifth embodiment, a fiber coupler having phase characteristics and a branching ratio as desired can be fabricated.

Now, the sixth embodiment of the present invention will be described.

Figure 7:
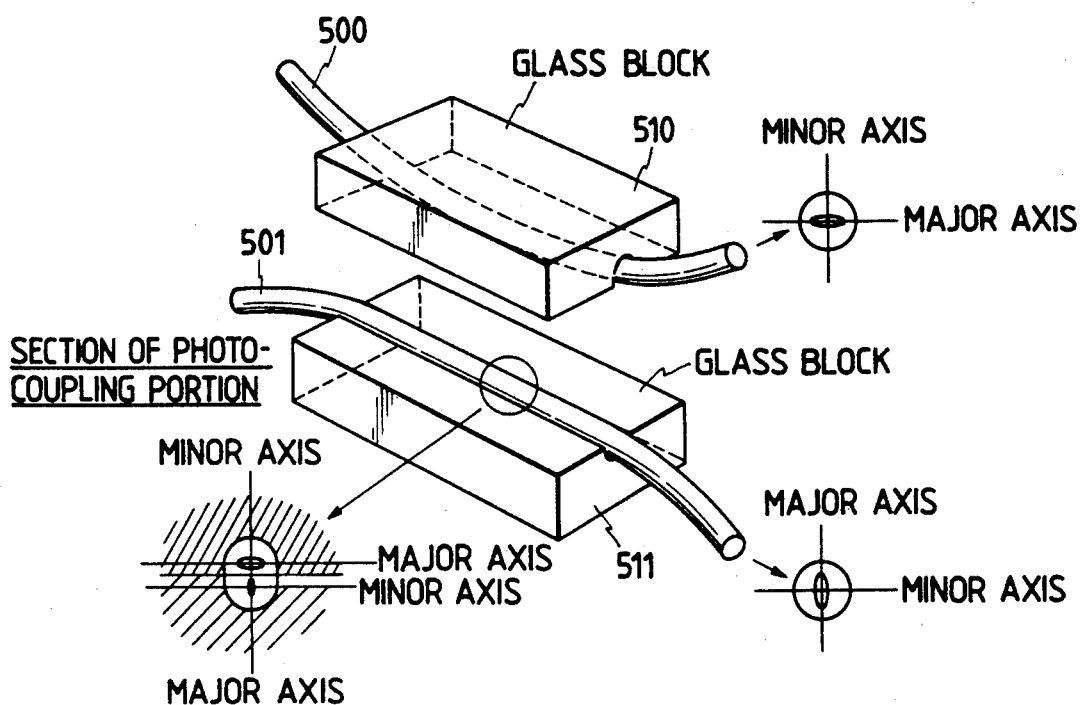
FIG. 7 shows an example of the construction of the optical branching/coupling unit of the present invention.

FIG. 7 illustrates a fabrication method for the optical branching/coupling unit according to this embodiment.

The sixth embodiment of the present invention shown in FIG. 7 exemplifies the optical branching/coupling unit of the side lapping type which employs polarization plane conserving fibers.

Referring to FIG. 7, the first and second polarization plane conserving fibers 500, 501 are structurally identical and are respectively buried in glass blocks 510, 511. In the side lapping process, the side face of the glass block of each optical fiber is lapped to the extent of exposing the surface layer of the core of the optical fiber.

When the two glass blocks 510, 511 are stacked to confront the cores of the first and second optical fibers 500, 501 each other, photocoupling takes place between the two optical fibers because the sideward clad layers of these optical fibers have been removed by the lapping.

According to the sixth embodiment, in buring the polarization plane conserving fibers 500, 501 in the respective glass blocks 510, 511, the faces to be lapped are made different so that the first optical fiber 500 may be lapped on one side of the principal axis of the birefringent index thereof, while the second optical fiber 501 may be lapped on the other side of the principal axis of the birefringent index thereof.

More specifically, a polarization plane conserving fiber is generally endowed with an axial anisotropy by any expedient, e.g., shaping the core thereof into an ellipse as shown in FIG. 7. Therefore, the elliptic core fiber presents the birefringence that the major axis and minor axis of the core have unequal refractive indices.

In the sixth embodiment, one of the lapped surfaces of the optical fibers 500, 501 lies on the major axis side of the core, while the other lies on the minor axis side, and the major and minor axes of the elliptic cores intersect orthogonally, thereby to effect the photocoupling. Accordingly, two light propagation paths whose propagation constants differ from each other are coupled, and the asynchronous optical branching/coupling unit is obtained.

Naturally, the expedient adopted in the sixth embodiment, in which the asynchronous optical branching/coupling unit is realized by fabricating the fiber coupler with the polarization plane conserving fibers intersecting orthogonally, is not restricted to the side lapping process, but it is also applicable to the method of fabricating the fiber coupler as based on the fusion stretching explained in the fifth embodiment. Besides, in this case, the phase characteristics of the optical branching/coupling unit can be set more flexibly by affording different stretching conditions as in the fifth embodiment.

Further, unlike the method in which the fiber coupler is fabricated using the two optical fibers of the identical structure as in each of the fifth and sixth embodiments, a fiber coupler may well be fabricated using two different optical fibers of unequal propagation constants. In this case, a difference is originally existent in the propagation constants, so that an asynchronous optical branching/coupling unit can be obtained even when the fabricating steps of the fiber coupler are completely symmetric for the two optical fibers. Besides, it is advantageous for freely adjusting the phase characteristics of the optical branching/coupling unit that, using the two different optical fibers of unequal propagation constants, the fiber coupler is fabricated by the fabrication method according to the fifth or sixth embodiment.

Now, the seventh embodiment of the present invention will be described.

Figure 8:
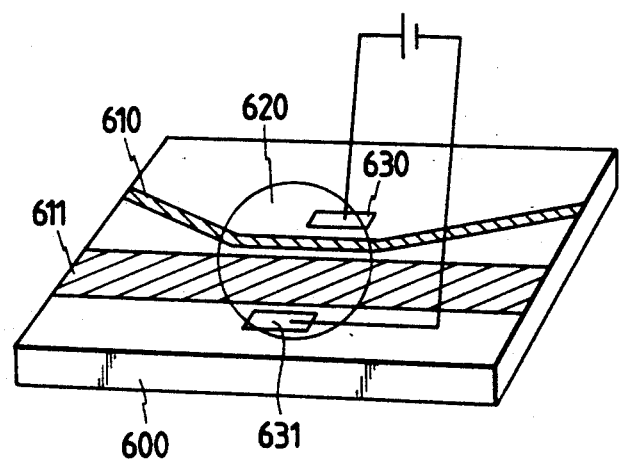
FIG. 8 shows an example of an optical branching/coupling unit employing an optical integrated circuit.

FIG. 8 illustrates a fabrication method for the optical branching/coupling unit according to this embodiment.

In this embodiment, the optical branching/coupling unit of the waveguide type is realized using an optical integrated circuit.

Referring to FIG. 8, an optical integrated circuit substrate 600 is a crystal of lithium niobate (LiNbO$_3$), on which optical waveguide paths 610, 611 are formed by sticking titanium (Ti) stripes and then performing thermal diffusion.

General methods of fabricating such optical integrated circuits are stated in, for example, "Optical Integrated Circuits" by Hiroshi NISHIHARA, Masamitsu HARUNA and Toshiaki SUBARA, pp. 145-182.

In FIG. 8, the two optical waveguide paths 610, 611 are closely proximate and parallel in a photocoupling portion 620, thereby to form a so-called directional coupler.

In the seventh embodiment, the widths of the optical waveguide paths 610, 611 are made unequal, thereby to prevent the propagation constants of both the paths from agreeing.

Accordingly, the optical branching/coupling unit becomes asynchronous, and an interference sensor endowed with a phase bias can be provided by the use of this unit.

Electrodes 630, 631 have a voltage applied thereacross, whereby the refractive indices of the waveguide paths are changed by an electrooptic effect so as to adjust the phase characteristics of the optical branching/coupling unit to a predetermined value.

Now, the eighth embodiment of the present invention will be described.

Figure 9:
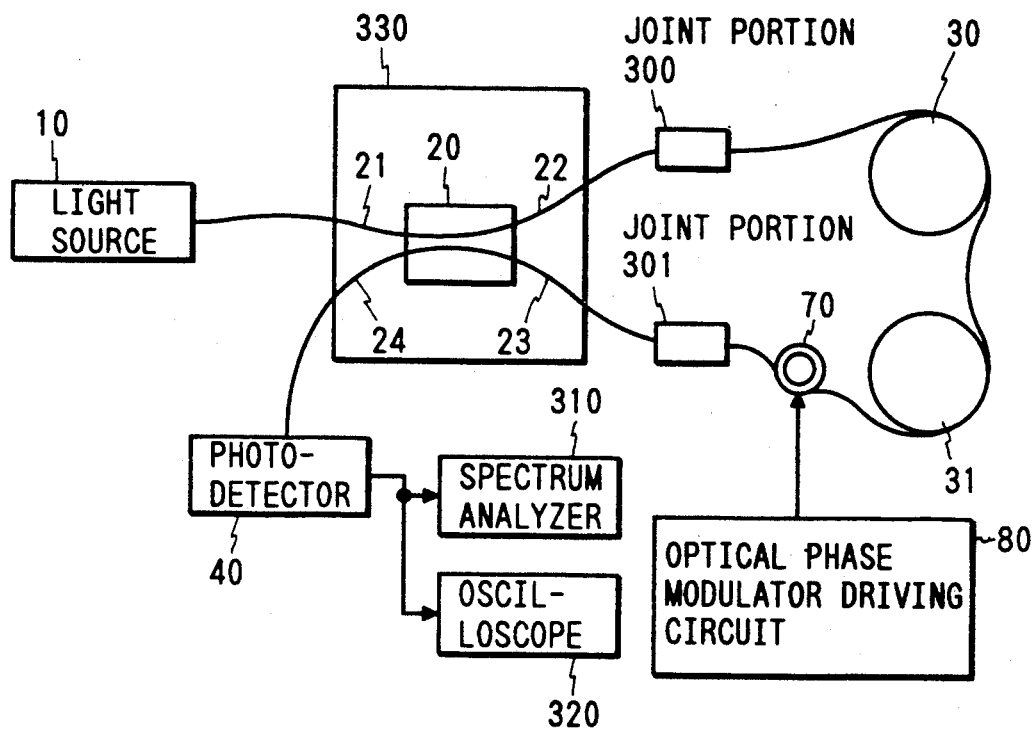
FIG. 9 shows the construction of an optical fiber gyroscope-fabricating apparatus according to the present invention.

FIG. 9 shows the construction of a fabrication apparatus for an interference sensor and an optical branching/coupling unit according to this embodiment.

Referring to FIG. 9, light from a light source 10 is guided to the first terminal 21 of the optical branching/coupling unit to-be-fabricated 20.

The light is bifurcated into the first light which emerges from the optical branching/coupling unit 20 via the second terminal 22 thereof, and the second light which emerges via the third terminal 23. The first light propagates through the first fiber loop 30, the second fiber loop 31 and an optical phase modulator 70 in succession, whereupon it enters the optical branching/coupling unit 20 via the third terminal 23 thereof.

On the other hand, the second light emerging via the third terminal 23 propagates through the optical phase modulator 70, the second fiber loop 31 and the first fiber loop 30 in succession in a direction reverse to that of the first light, whereupon it enters the optical branching/coupling unit 20 via the second terminal 22 thereof.

Joint portions 300, 301 are portions for joining optical fibers to each other. However, in a case where the interference sensor is to be fabricated in a continuous unitary structure, these joint portions may well be omitted.

In addition, the first fiber loop 30 and the second fiber loop 31 have equal sensitivities to the Sagnac effect and are wound in directions opposite to each other, thereby to cancel out a phase difference developed by a rotation. The second fiber loop 31 is inserted also for eliminating influences ascribable to vibrations etc. Accordingly, if the optical system is vibration-proof satisfactorily, the second fiber loop 31 may well be omitted.

Further, depending upon environmental conditions such as a magnetic field and a temperature, measures are properly taken so that non-reciprocal phase differences to appear in the ring interferometer shown in FIG. 9 may be eliminated to the utmost, whereby only the phase characteristics of the optical branching/coupling unit comprised are reflected upon the interference signal of the ring interferometer.

The first and second light beams having entered the optical branching/coupling unit 20 via the second terminal 22 and third terminal 23 are conjoined in this unit 20, and part of the resulting light emerges from the optical branching/coupling unit 20 via the fourth terminal 24 thereof as interference light. A photodetector 40 detects the interference light, and generates the interference signal P(t).

In general, the interference signal P(t) depends upon an optical phase modulator driving signal $\psi(t)$ generated by an optical phase modulator driving circuit 80, the phase characteristics $\alpha$ of the optical branching/coupling unit 20, and a non-reciprocal phase difference $\phi_s$ developed in the ring interferometer.

In the case of the eighth embodiment, however, the non-reciprocal phase difference $\phi_s$ is reduced to the utmost as stated above.

As in the case of the third embodiment, the formula of the interference signal P(t) is computed as given by Eq. (19):

$$P(t) = K I \{1 + v\cos(2\alpha + \psi(t) - \psi(t-\tau))\} \quad (19)$$

Here, in a case where Eq. (20) holds:

$$\psi(t) = \psi_\mu \sin \omega_\mu t \quad (20)$$

the interference signal P(t) is expressed by Eq. (21), under the assumption of $\eta = 2\phi_M \sin(\omega\tau/2)$:

$$P(t) = K I \{1 + v\cos 2\alpha \times \quad (21)$$

$$\left(J_0 + 2\sum_{n=1}^{\infty} J_{2n}(\eta) \cos 2n\omega_\mu(t - \tau/2)\right) - v\sin 2\alpha \times$$

$$\left(\sum_{n=0}^{\infty} J_{2n+1}(\eta) \cos(2n+1)\omega_\mu(t - \tau/2)\right) \}$$

Thus, it is understood that, in general, when the optical phase modulator driving signal is assumed periodical, the interference signal is also periodical, and that the amplitudes of the even-numbered harmonic components and odd-numbered harmonic components of the interference signal are respectively proportional to $\cos 2\alpha$ and to $\sin 2\alpha$.

A spectrum analyzer 310 functions to measure the amplitudes of the higher harmonic components of the phase modulation frequency $\omega_\mu$ of the interference signal. With the spectrum analyzer 310, the modulation index $\eta$ and the phase difference $\alpha$ can be calculated from the amplitude ratios of the spectral components.

The phase characteristics of the optical branching/coupling unit 20 change every moment in the course of fabricating this unit 20 in an optical branching/coupling unit-fabricating apparatus 330.

Accordingly, a loss, a branching ratio and the phase characteristics need to be simultaneously measured as the performance characteristics of the optical branching/coupling unit 20.

The phase characteristics are found from the spectrum analysis of the interference signal as stated above.

Expedients for measuring the loss and the branching ratio will be explained below.

First, the branching ratio $\sigma$ can be expressed by Eq. (22) when the light quantities of the first light and second light stated above are respectively denoted by $I_1$ and $I_2$:

$$\sigma = I_2/I_1 \quad (22)$$

Meanwhile, the visibility $v$ is determined by the light quantities of these light beams forming the interference light and is in the relationship of Eq. (23):

$$v = 2\sqrt{I_1 I_2/(I_1 + I_2)} \quad (23)$$
$$= 2\sqrt{\sigma/(1 + \sigma)}$$

It is accordingly understood that, when the visibility $v$ is measured, the branching ratio $\sigma$ is also found.

Figure 10:
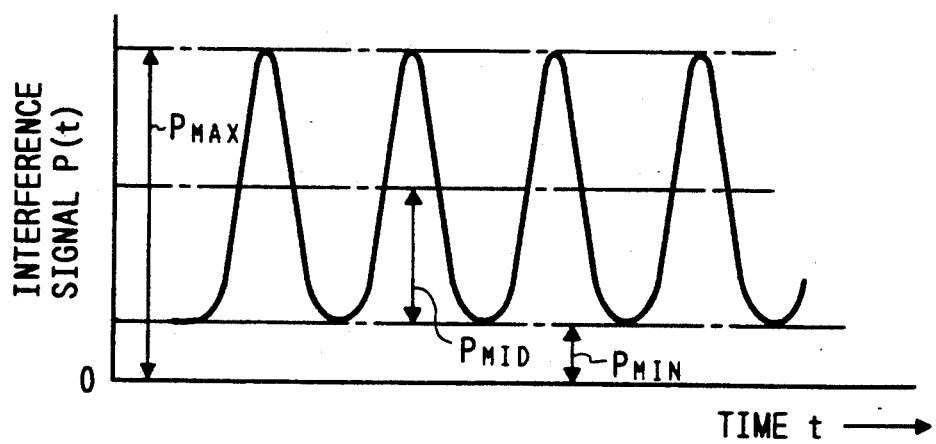
FIG. 10 is a diagram for explaining the operation of the apparatus in FIG. 9.

The time-varying waveform of the interference signal observed with an oscilloscope 320 is as shown in FIG. 10, and the visibility $v$ is evaluated from Eq. (24) by measuring the maximum value $P_{MAX}$, minimum value $P_{MIN}$ and middle value $P_{MID}$ of the interference signal:

$$v = (P_{MAX} - P_{MIN})/(2 P_{MID}) \quad (24)$$

Next, the loss of the optical branching/coupling unit 20 is obtained immediately from the quantity of received light of the photodetector 40. More specifically, assuming the loss of the optical branching/coupling unit 20 to be null, the quantity of the light having entered this unit 20 via the terminal 21 from the light source 10 is obtained as the quantity of the emergent light from the terminal 24 in accordance with the branching ratio. In a case where the loss is finite, the level of the interference signal which is delivered from the photodetector 40 lowers in proportion to the loss. Therefore, the loss of the optical branching/coupling unit 20 can be known from the absolute amplitude of a spectrum presented by the spectrum analyzer 310 or from the amplitude of the time-varying waveform of the interference signal observed with the oscilloscope 320.

Thus, according to the eighth embodiment of the present invention, the loss, branching ratio and phase characteristics of the optical branching/coupling unit can be simultaneously measured in the course of fabricating this optical branching/coupling unit.

Therefore, when the optical branching/coupling unit is fabricated in accordance with this embodiment, it is possible to realize an optical branching/coupling unit having desired characteristics and an interference sensor employing the optical branching/coupling unit.

By the way, the optical branching/coupling unit-fabricating apparatus 330 should desirably be based on any of the fusion stretching process indicated in the fifth embodiment, the side lapping type indicated in the sixth embodiment, the adjustment of the electrooptic effect of the optical integrated circuit as indicated in the seventh embodiment, and the likes.

While the optical branching/coupling units mentioned above can be employed for the interference sensors of optical fiber gyroscopes etc. as stated before, they can also be applied to optical communication systems etc.

Now, the ninth embodiment of the present invention will be described.

Figure 11:
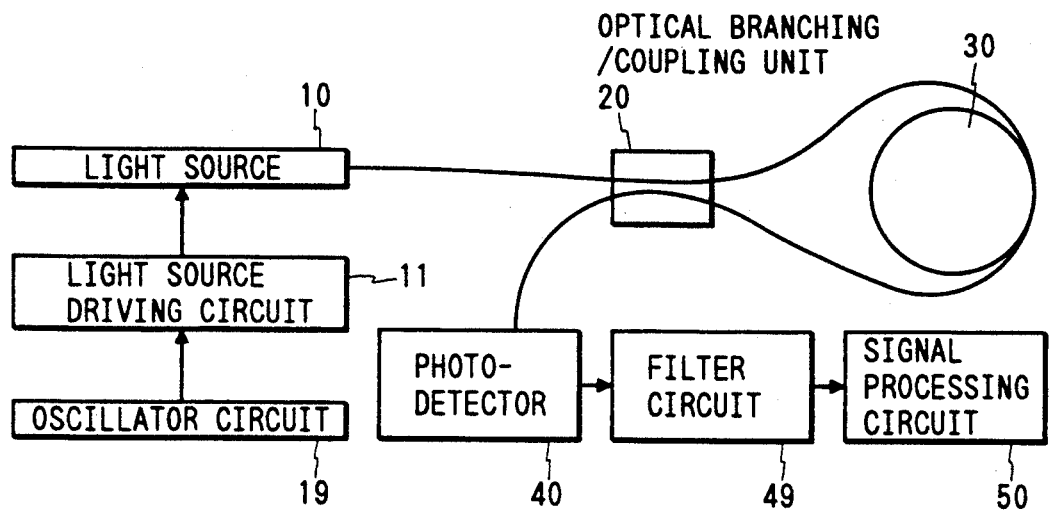
FIG. 11 shows an optical fiber gyroscope in the ninth embodiment of the present invention.

FIG. 11 shows an optical fiber gyroscope according to this embodiment.

The optical fiber gyroscope shown in FIG. 11 is quite the same as the first embodiment of the present invention depicted in FIG. 1, except an oscillator circuit 19 and a filter circuit 49.

In the optical fiber gyroscope illustrated in FIG. 1 or FIG. 11, the light having propagated through the fiber loop 30 is fed back to the coherent light source such as laser source 10 with the delay of the propagation time $\tau$, as detailed in the description of the first embodiment. Therefore, the laser source 10 is irradiated with the laser beam emitted by itself and is subjected to coherent feedback, so that the lasing thereof sometimes becomes astable.

Figure 12:
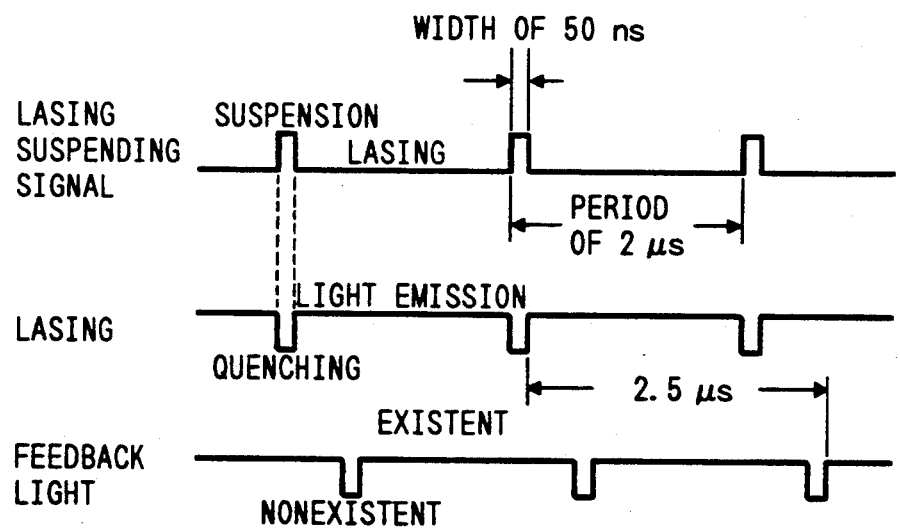
FIG. 12 is a diagram for explaining the operation of the ninth embodiment.

With this embodiment, in order to eliminate an evil effect ascribable to the coherent feedback, the lasing of the laser source 10 is suspended for a moment in such a way that, as illustrated in FIG. 12, the oscillator circuit 19 generates a lasing suspending signal for a period shorter than the propagation time $\tau$, thereby to control the laser driving circuit 11.

The time interval of the lasing suspension may be very slight, and it is actually determined by the responsiveness of circuit elements constituting the laser driving circuit 11.

By way of example, when the length of the fiber loop 30 is 500 meters, the propagation delay time $\tau$ is about 2.5$\mu$ sec.

As illustrated in FIG. 12, therefore, the lasing suspending signal which has a pulse width of 50 nsec. and a recurrence period of 2$\mu$ sec. and which is generated by the oscillator circuit 19 operating at 10 MHz is superposed on a laser bias current produced by the laser driving circuit 11.

Thus, the laser source 10 emits pulse light at a duty ratio of 97.5%. Since the laser source 10 is almost always in its lasing state in this manner, the average light quantity thereof is not greatly different from that in the case of continuous lasing.

Nevertheless, regarding the evil effect of the coherent feedback, the light to be fed back to the laser source 10 is always one emitted before suspending the lasing once, and it differs from the presently emitted light in frequency and phase and has no correlation therewith. That is, the coherent effect is eliminated.

Besides, the interference light to be detected by the photodetector 40 is in the shape of a pulse at the same duty ratio because the laser source 10 is intermittently driven. The interference signal delivered from the photodetector 40 is accordingly pulsative, and it is smoothed by the filter circuit 49.

The output of the filter circuit 49 is processed by the signal processing circuit 50 in the same manner as in the first embodiment.

By the way, the ninth embodiment thus far described is not restricted to the optical fiber gyroscope having the optical system arrangement referred to, but it is applicable to any interference sensor employing a ring interferometer. Particularly in an optical fiber gyroscope which adopts a phase modulation method stated in, e.g., the official gazette of Japanese Patent Application Laid-open No. 94680/1981, the ninth embodiment can remarkably relieve an amplitude modulation effect on a laser beam intensity as caused by a phase modulation frequency ascribable to the feedback of coherent light, as well as the higher harmonic components thereof.

According to the embodiments of the present invention described above, effects to be listed below are achieved.

Since the 90° phase bias of an interferometer is realized by an optical branching/coupling unit, the optical path of interference light need not be split, and an interference sensor of stable characteristics is provided.

In addition, since means for detecting and compensating a laser radiation quantity as based on a control for stabilizing the laser radiation quantity or on phase modulation means are comprised, an interference sensor whose voltage scale is stable against the fluctuation of the laser radiation quantity can be realized.

Further, since an interference sensor whose sensitivity is set at the optimum can be obtained using an optical branching/coupling unit of any desired phase characteristics, the fabrication specifications of the optical branching/coupling unit can be relieved.

Besides, the fluctuation of the phase characteristics of an optical branching/coupling unit can be compensated by applying a reset signal when a phase difference to-be-measured is zero. This brings forth the effect that requirements for stabilizing the characteristics of the optical branching/coupling unit can also be relieved.

Besides, the loss, branching ratio and phase characteristics of an optical branching/coupling unit can be simultaneously measured in the course of the fabrication of the optical branching/coupling unit. Also, according to such an embodiment, in fabricating a fiber coupler type optical branching/coupling unit on the basis of a fusion stretching process, two fibers are stretched asymmetrically, so that the optical branching/coupling unit whose phase characteristics are set at a desired value is provided.

Further, phase characteristics are freely set in an optical branching/coupling unit employing a fiber coupler which is fabricated with the axes of anisotropy of polarization plane conserving fibers intersecting orthogonally, two optical fibers whose propagation constants are different from each other, or two optical waveguide paths which are formed on an optical integrated circuit; an optical branching/coupling unit employing an optical integrated circuit which includes refractive-index controlling means based on an electrooptic effect; and so on.

Moreover, since a laser source has its lasing condition changed by such an expedient as interrupting it for a moment at a period shorter than the return time of feedback light, the lasing thereof does not become astable due to the effect of the coherent feedback of the feedback light. In this case, the suspension of the lasing may be for a very short time, so that the duty ratio of the laser source can be set nearly 1 (one), and the quantity of laser radiation hardly decreases.

Figure 13:
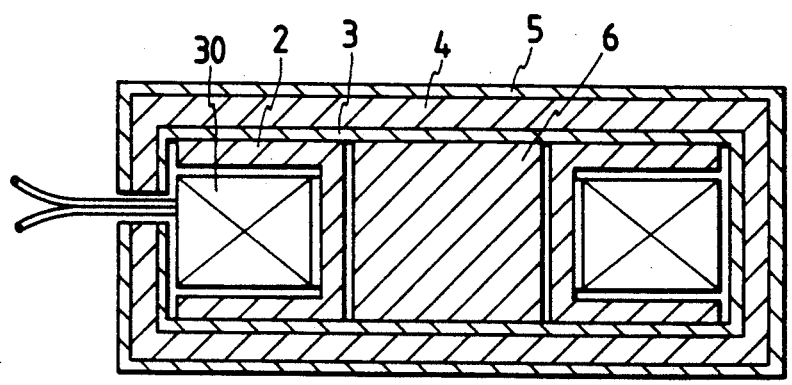
FIG. 13 is a sectional view of an example of a thermal buffer box according to the present invention.

FIG. 13 shows a thermal buffer box which receives an optical fiber loop portion in order to prevent the influence of an ambient temperature.

An optical fiber loop 30 is such that a single optical fiber, for example, polarization plane conserving optical fiber which is several meters-several hundred meters long is wound round a spool 2 into the shape of a coil. It is the same as the optical fiber loop 30 in FIG. 1.

The optical fiber loop 30 and the spool 2 are surrounded with a heat transmission casing 3, which is surrounded with a heat insulation casing 4. As the outermost layer of the thermal buffer box, a heat transmission casing 5 is formed surrounding the heat insulation casing 4.

The heat transmission casings 3, 5 and the heat insulation casing 4 constitute the thermal buffer box according to the present invention.

The spool 2 is made of a material of high thermal conductivity and small coefficient of linear expansion, for example, SiC ceramics. In addition to the role as the mere spool, it functions to diffuse heat and functions to diminish a temperature change owing to its heat capacity.

Each of the heat transmission casings 3, 5 is a sealed casing made of a material of the highest possible thermal conductivity, for example, aluminum or copper. Besides preventing the inflow and outflow of the air, it functions to diffuse heat and functions to diminish the temperature change owing to its heat capacity. The heat insulation casing 4 is made of a heat insulator of the lowest possible thermal conductivity, namely, high thermal resistance, for example, a foamed plastic.

A spacer 6 is fitted in the central space of the spool 2. It prevents irregular air convections and irregular temperature changes from occurring.

Next, the operation of the thermal buffer box will be described.

First, in a case where heat has been locally transferred from outside by heat conduction, air convection, or heat radiation, the transferred heat is diffused along the surface of the heat transmission casing 5 by the heat conduction thereof, and a temperature rise is moderated by the heat capacity thereof.

Further, the heat is passed through the heat insulation casing 4 and is transferred to the heat transmission casing 3 by heat conduction. The quantity of heat to be transferred to the heat transmission casing 3 at this time is rendered slight by the heat insulating function of the heat insulation casing 4. Therefore, the temperature distribution of the entire heat transmission casing 3 becomes uniform, and the temperature rise thereof becomes a very small value. That is, the thermal time constant of the heat transmission casing 3 is, in effect, enlarged, and even when a thermal shock has acted from outside, it is moderated to render the temperature change of the heat transmission casing 3 small. Thus, the heat transmission casings 3, 5 and the heat insulation casing 4 function as the thermal buffer box overall.

The heat of the heat transmission casing 3 is transferred to the spool 2 and the spacer 6, and the thermal shock is moderated still more. Then, a slight quantity of heat is uniformly transferred to the outer periphery of the optical fiber loop 30. Thus, the temperature distribution of the entire optical fiber loop 30 becomes uniform, and simultaneously, the temperature change thereof becomes very slow (the thermal time constant thereof becomes several tens minutes-several hours).

As a result, the respective optical path lengths of two light waves passing through the optical fiber loop 30 in directions reverse to each other become quite equal, and the drift of an optical fiber gyroscope can be prevented from occurring.

With this method, a thermal bridge included in an optical fiber gyroscope in the prior art is omitted. The omission is based on, not only for the reason of diminishing a temperature change, but also for the following reason:

Assuming the thermal resistance of the heat insulation casing 4 to be infinity, when the optical fiber loop 30 has developed heat, the temperature thereof rises limitlessly at a temperature rise rate which corresponds to the product between the total heat capacity of the heat transmission casing 3, spool 2, optical fiber loop 30 and spacer 6 and the quantity of heat developed by the optical fiber loop 30. This is very demeritorious.

In the prior-art device, therefore, the demerit is eliminated by disposing the thermal bridge.

Herein, in actuality, the heat insulation casing 4 does not insulate heat ideally, but it passes heat though slightly. On the other hand, the quantity of heat developed by the optical fiber loop 30 is on the order of 200 $\mu W$ even when the optical fiber is assumed to have a total length of 1 km, to receive the light waves at a total power value of 1 mW and to exhibit a loss of 1 dB/km. Therefore, the temperature change width and temperature rise rate of the optical fiber loop 30 are small, and the temperature distribution of the entire optical fiber loop 30 becomes uniform.

Accordingly, the thermal bridge may be omitted.

As stated above, this embodiment has the effects that the temperature rise rate of the optical fiber loop 30 can be diminished and that the drift of the optical fiber gyroscope can be minimized.

In addition, the changes of the length and radius of the optical fiber loop 30 dependent upon temperatures can be relieved by making the spool 2 out of the SiC ceramics. This brings forth the effect of stabilizing the sensitivity of the optical fiber gyroscope.

Besides, when the thermal buffer box is put into a structure of more layers by inserting a heat insulation casing anew between the spool 2 and heat transmission casing 3 of this embodiment, the gradient of the temperature change of the optical fiber loop 30 becomes smaller, to bring forth the effect of minimizing the drift of the optical fiber gyroscope.

Now, another embodiment will be described with reference to a vertical sectional view shown in FIG. 14.

This embodiment is such that the heat transmission casings 3, 5 in the preceding embodiment are omitted.

Figure 14:
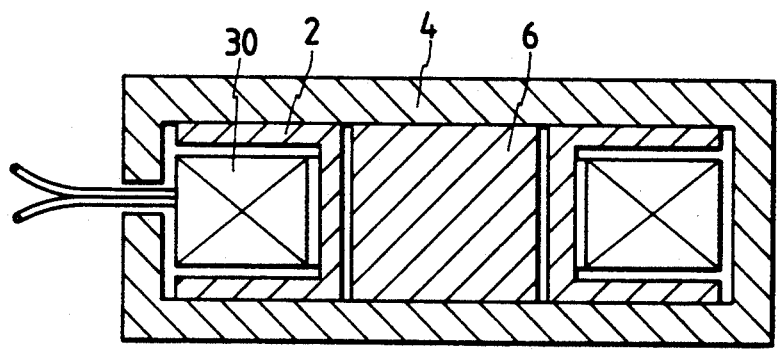
FIG. 14 is a sectional view of another example of the thermal buffer box of the present invention.

The optical fiber loop 30 being the angular velocity detection portion of an optical fiber gyroscope, as shown in FIG. 14, is wound round the spool 2, and these constituents 30, 2 are enveloped in the heat insulation casing 4. The spacer 6 is fitted in the central part of the spool 2.

The optical fiber loop 30 is combined with unshown elements such as an optical phase modulator, a photocoupler and a laser diode. Thus, the optical system of the phase modulation type optical fiber gyroscope being the commonest is formed.

Next, the operation of the thermal buffer box will be described.

Although, in this embodiment, the heat transmission casings 3, 5 in the preceding embodiment are omitted, the spool 2 has a heat diffusing function and a heat capacity. By reinforcing the heat insulating function of the heat insulation casing 4, therefore, the quantity of incoming heat can be decreased to moderate the temperature change of the optical fiber loop 30. Thus, effects similar to those of the preceding embodiment can be attained.

According to this embodiment, the heat transmission casings 3, 5 of heavy weights are not included, and this brings forth the effect that the optical fiber gyroscope can be made light in weight.

Besides, in each of the preceding embodiment and this embodiment, the spacer 6 may well be removed so as to receive in the resulting space the electronic circuit portion of an optical component not developing much heat, for example, a photocoupler, polarizer or optical phase modulator. In that case, there is the effect that the optical fiber gyroscope can be made small in size.

Besides, when the surface of the heat transmission casing 5 in FIG. 13 or that of the heat insulation casing 4 in FIG. 14 is whitened or made specular with, for example, nickel plating, a temperature rise ascribable to the intrusion of radiation heat can be prevented, to enhance the effects of the invention still more.

Further, in the embodiments shown in FIGS. 13 and 14, each of the heat transmission casings 3, 5 and the heat insulation casing 4 may well be put into a shape having a central through-hole, for example, the shape of a doughnut. In that case, a component developing heat, for example, a laser diode or electric circuit can be received in the through-hole, to bring forth the effect that the optical fiber gyroscope can be made small in size.

Still further, according to the above embodiments, the temperature change of the optical fiber loop 30 is moderated, so that a relevance is often found between the temperature change of the optical fiber loop 30 and the output change of the optical fiber gyroscope. Accordingly, the output of the optical fiber gyroscope can be corrected in such a way that the temperature of the optical fiber loop 30 is measured by a thermistor or the like and that arithmetic processing is executed by a computer, using the measured temperature as a variable. Thus, the present invention becomes more effective.

By the way, in the above embodiments, the optical fiber loop 30 is the optimum when the optical fiber is wound round the spool 2 so as to become thermally symmetric with respect to the center of the length of the optical fiber.

Also, the material of the spool 2 is not restricted to the special material such as SiC ceramics, but it may well be aluminum or any of plastics usually employed. In this case, the effects of the present invention are not spoilt.

Now, the embodiment of the present invention concerning the assemblage of a vibration type optical phase modulator will be described with reference to an exploded perspective view shown in FIG. 15.

Figure 15:
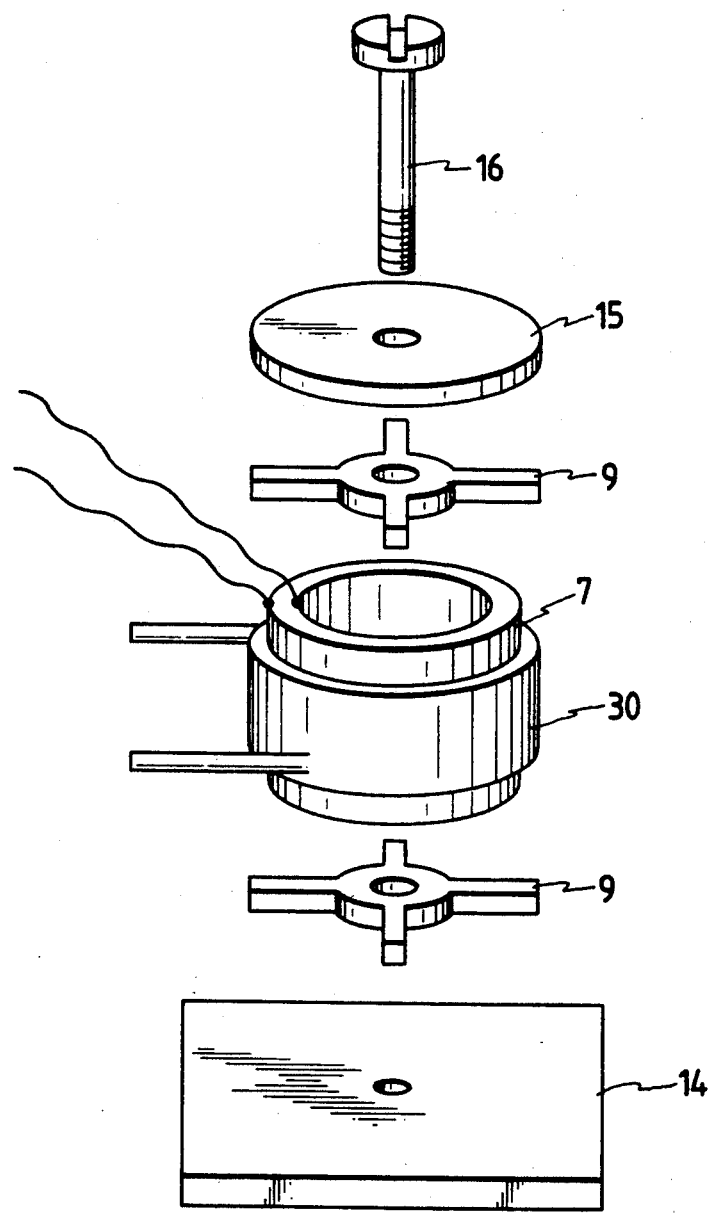
FIG. 15 is an exploded perspective view showing a method of mounting an optical fiber gyroscope.

An optical fiber loop 30, which is the angular velocity detecting portion of an optical fiber gyroscope shown in FIG. 15, is wound round and bonded to a piezoelectric element 7 which is the vibration type optical phase modulator exploiting an electromechanical effect.

The structure configured of the components 30 and 7 has two buffers 9 respectively located over and under it, and is attached to a pedestal 14 by a screw 16 through a washer 15. The washer 15 and the pedestal 14 are portions for mounting the piezoelectric element 7.

Next, the operation of this embodiment will be described.

When the piezoelectric transducer 7 has an A.C. voltage applied across its electrodes, it is vibrated by a piezoelectric effect to increase or decrease the circumferential length thereof.

The optical fiber loop 30 is wound round the piezoelectric transducer 7 into the shape of a coil and is fixed thereto with an adhesive. It is lengthened or shortened in proportion to the increase or decrease of the circumferential length of the piezoelectric transducer 7.

Meanwhile, when the sinusoidal A.C. voltage is applied across the electrodes of the piezoelectric transducer 7, the length of the optical fiber 30 is sinusoidally increased or decreased. Herein, the state of the length change differs delicately, depending upon the method of mounting the piezoelectric transducer 7.

As the mounting method for the piezoelectric transducer 7, it is the best that, just as a wind-bell, the piezoelectric transducer 7 is hung in midair by a string. In that case, nothing prevents the piezoelectric transducer 7 from vibrating, and this transducer 7 is distorted least. The present invention is intended to realize such a mounted state.

The buffers 9 are members for mounting the piezoelectric transducer 7, and they are manufactured by molding any of pliable rubbers and plastics into the shape of rods. The central ring-shaped part of each buffer 9 is used for assemblage, and it is not indispensable to the buffering function and need not be pliable.

The washer 15 is a mere keeper plate, and the screw 16 is an ordinary one.

The constituent components are placed on one another in the illustrated order, and are finally fixed by the screw 16. In tightening the screw 16, it is important to bestow the minimum required torque.

As a result, the piezoelectric transducer 7 is mounted on the pedestal 14 in the state in which it is held between the pliable buffers 9, so that it is freely vibrated. Thus, a satisfactory modulation degree is attained, and no appreciable modulation distortion appears.

According to this embodiment, in spite of the comparatively simple construction, there is the effect of rendering the modulation distortion very small.

In the embodiment shown in FIG. 15, each buffer 9 and the piezoelectric transducer 7 lie in contact at four points, but this configuration is not restrictive. By way of example, the components 9 and 7 may well lie in contact at two points (the upper and lower buffers 9 are arrayed so as to intersect orthogonally). Although, in this case, the mounting becomes somewhat astable, the pliability of the buffers 9 increases to enhance the buffering effect.

Besides, each of the buffers 9 may well be such that a rubber band commercially available is severed and that a suitable number of severed pieces are arrayed. In this case, there is the effect that the buffers 9 are made inexpensive.

Moreover, the sectional shape of the contact point between the buffer 9 and the piezoelectric transducer 7 is not restricted to a square, but it may well be a circle or a triangle. The effects of the invention are not spoilt in this case.

Further, when the optical fiber loop 30 combined with the buffers 9 is enveloped in the thermal buffer box of either of the foregoing embodiments, drifts ascribable to a modulation distortion and a temperature change are mitigated, and an optical fiber gyroscope of high accuracy can be provided.

When a navigation system is constructed by the use of the optical fiber gyroscope according to the present invention, it is possible to provide the navigation system of high accuracy which undergoes a slight drift even in the presence of a temperature change.

By applying the navigation system to a moving object such as vehicle, ship, aircraft or artificial satellite, it is possible to provide the moving object having the navigation system, which is excellent in mechanical and thermal enviromental durabilities.

According to the present invention thus far described, the following effects are achieved:

An optical fiber loop is enveloped in only a light-weight box of heat insulator, whereby an optical fiber gyroscope of light weight and small drift can be realized.

In addition, a thermal buffer box is constructed of a multilayer structure of heat insulator and thermal conductor, whereby the temperature change of an optical fiber loop can be rendered the slowest, and hence, an optical fiber gyroscope of the smallest drift can be realized.

Besides, in a case where the spool of an optical fiber loop is made of a material of high thermal conductivity and small linear expansion coefficient, an optical fiber gyroscope of small drift and small sensitivity fluctuation can be realized.

Besides, the surface of a thermal buffer box is made white or specular to shut off radiation heat and to diminish the temperature change of an optical fiber loop, whereby an optical fiber gyroscope of small drift and small sensitivity fluctuation can be realized.

Besides, buffers are made of rod-like rubber, whereby an optical fiber gyroscope of small drift can be realized at low cost.

Now, there will be described gyroscope constructions which are well suited to eliminate the offset of a signal processing system in the optical fiber gyroscope of the present invention, and the drifts ascribable to the changes of ambient conditions.

Figure 16:
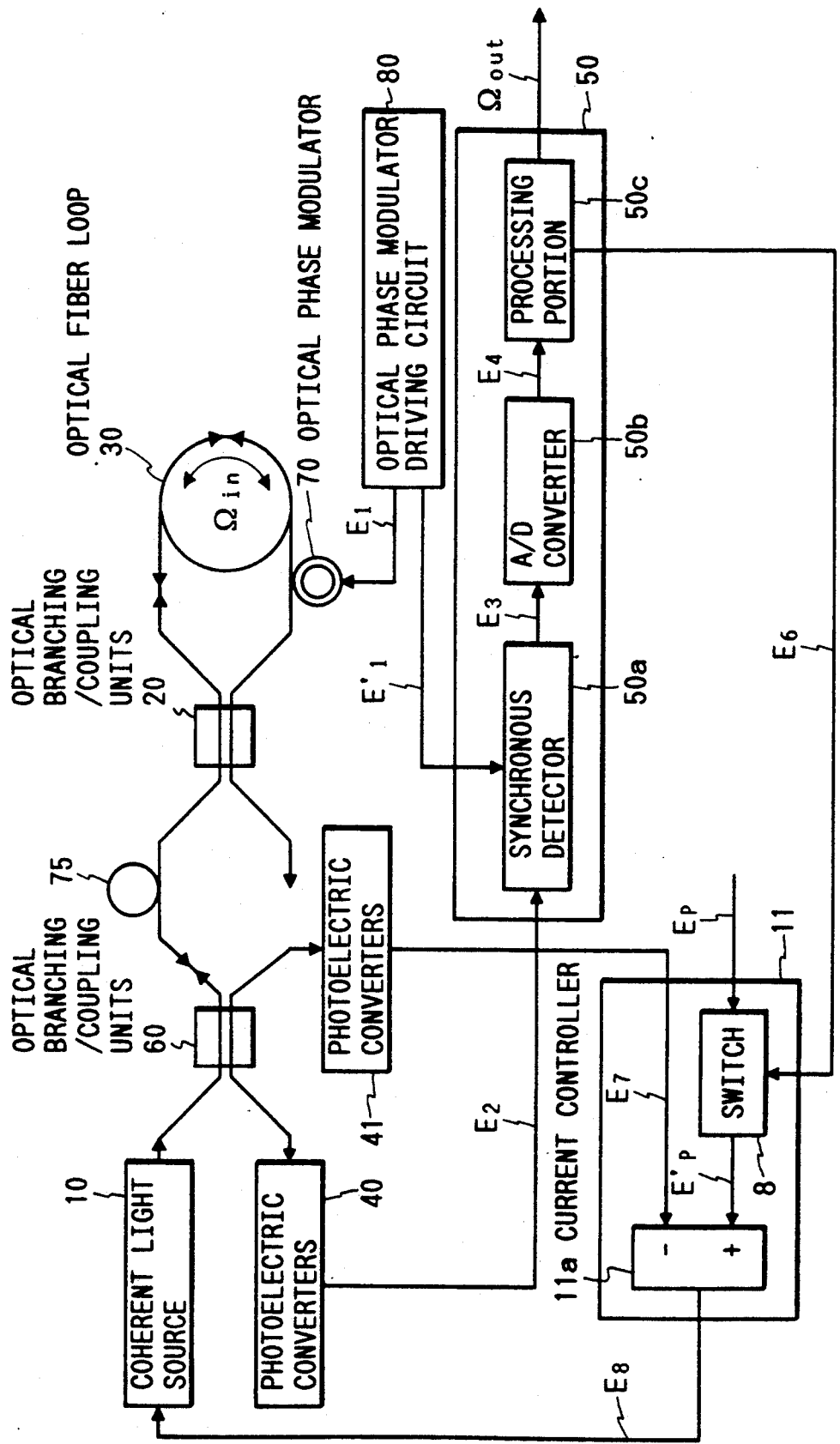
FIG. 16 shows the tenth embodiment of the optical fiber gyroscope of the present invention.

FIG. 16 shows the tenth embodiment of the present invention. The construction of this embodiment is basically the same as in FIG. 2. In FIG. 2, the photodetector 40 for deriving a gyroscope signal is disposed on the side of the optical branching/coupling unit 20, whereas in FIG. 16, it is disposed on the side of the optical branching/coupling unit 60. Essentially, however, this difference has no significance.

Referring to FIG. 16, an optical system is constituted by the coherent light source 10, optical branching/coupling units 20, 60, polarizer 75, optical fiber loop 30 and phase modulator 70. By way of example, a conventional laser diode or an super-emission type diode is used as the coherent light source 10. The optical branching/coupling units 20, 60 are beam splitters which are based on an evanescent effect and which are made of optical fibers. As stated before, the polarizer 75 is such that a special optical fiber having polarization characteristics is wound in the shape of a coil. The optical fiber loop 30 is such that an optical fiber having a total length of several hundred meters is wound in the shape of a coil.

The phase modulator 70 is A.C.-wise light phase difference bias means in which an optical fiber having a total length of several meters is wound round a cylindrical electrostrictive element, and which changes an optical path length with an electric signal. In connecting the above components, the optical fibers are joined by fusion. Incidentally, the optical fibers used are, for example, polarization plane conserving optical fibers of single mode.

The other parts constitute the signal processing system. The photodetectors 40, 41 convert light outputs into voltages, and each of them is chiefly configured of a photodiode and a current-to-voltage conversion portion.

The A.C. signal $E_2$ of the photodetector 40 is an A.C. signal relevant to an input angular velocity $\Omega_{in}$. The monitor output $E_7$ of the photodetector 41 is a D.C. signal which serves to monitor the light output of the coherent light source 10, and which is proportional to the light output of the optical branching/coupling unit 60. A current controller 11a compares the monitor output $E_7$ with a command value $E'_p$ being the output of a switch circuit 8 and then finely adjusts a D.C. signal $E_8$ to be applied to the coherent light source 10, whereby the monitor output $E_7$, namely, the light output of the optical branching/coupling unit 60 is held constant.

A signal generator 80 is a multi-frequency oscillator which is, in general, configured of a crystal oscillator, a frequency divider, a phase shifter, a low-pass filter, an attenuator, etc. It generates a sinusoidal drive signal $E_1$ of predetermined frequency (denoted by $f_m$) for driving the phase modulator 70. Further, it generates several sorts of pulse signals whose fundamental waves are integral times as high as $f_m$, as the synchronizing signals $E'_1$ of a plurality of synchronous detectors 50a. Here, in order to facilitate the description, the signal generator 80 is assumed to generate only the drive signal $E_1$ of the phase modulator 70 and the synchronizing signal $E'_1$ having the same frequency as that of the signal $E_1$.

The synchronous detector 50a includes an A.C. amplifier and an analog switch, or an analog multiplier, a low-pass filter and a D.C. amplifier. It detects a signal component relevant to the input angular velocity $\Omega_{in}$ as contained in the A.C. signal $E_2$, synchronously by the use of the synchronizing signal $E'_1$, and it converts the detected signal component into a D.C. output signal $E_3$.

An A/D (analog-to-digital) converter 50b converts the output signal $E_3$ into a digital signal $E_4$ of parallel or serial form.

A processing portion 50c is configured of a microcomputer, an input/output interface, etc. It delivers conversion command signals to several computing portions and other portions, for example, the A/D converter 50b. Further, it delivers an output $\Omega_{out}$ as the detection value of the input angular velocity $\Omega_{in}$. The output form of the detection value $\Omega_{out}$ is, e.g., a digital signal or analog signal of parallel or serial form conforming to the input form of an equipment which is connected at the next stage.

The above construction is the basic construction of the optical fiber gyroscope of the most typical phase modulation type, and is a preferable construction for performing the present invention. The switch 8 in the light source driving circuit 11 is a principal component in the present invention. By way of example, the switch 8 is an analog switch including a transistor. It is turned "on" or "off" to set the command value $E'_p$ at $E_p$ or zero, in accordance with the command signal $E_6$ of the processing portion 50c.

As to the above construction, there will be first explained a case where a detecting method in the prior art is employed, that is, a case where the light output of the optical branching/coupling unit 60 is a value along the command value $E'_p = E_p$ and is constant.

Here, the relationship between the input angular velocity $\Omega_{in}$ and the output signal $E_3$ of the synchronous detector 50a is expressed by the following approximate formulae:

$$E_3 = K_p \cdot K_m \cdot \sin K_s \Omega_{in} + E_o + E_e \qquad (25)$$

$$\Omega_{in} = (1/K_s)\{\sin^{-1}\{(E_3 - E_o - E_e)/K_p \cdot K_m\}\} \qquad (26)$$

Here, $K_p$ denotes a constant which relates to the magnitude of the light output entering the photodetector 40, the overall gain of the photodetector 40 and the synchronous detector 50a, and so forth. Besides, $K_m$ denotes a constant which relates to the degree of the depth of an A.C.-wise light phase difference bias, $K_s$ a constant which relates to the Sagnac effect, namely, the sensitivity of the optical system, $E_o$ the offset value of the optical system attributed to the imperfection of the optical system, and $E_e$ the electrical offset value of the signal processing system. It is accordingly understood that, unless the total value of the offset values $E_o$ and $E_e$ contained in the output signal $E_3$ is obtained by any method and is subtracted from the output signal $E_3$, the input angular velocity $\Omega_{in}$ being precise is not found, so an error develops in the detection value $\Omega_{out}$.

The total value of the offset values sometimes amounts to about 1% of a full scale. It fluctuates with the change of the ambient temperature, and forms a cause for a great drift.

The offset values in the prior-art method stated above were experimentally studied. Then, it has been found that, in case of using appropriate components for the optical system, the optical offset value $E_o$ is slight and is less than about 0.001% of the full scale, so it is sufficiently smaller as compared with the electrical offset value $E_e$. That is, the influence of the optical offset value can be eliminated by appropriately selecting the components to be used. By neglecting this term, therefore, Eqs. (25) and (26) are reduced as follows:

$$E_3 = K_p \cdot K_m \cdot \sin K_s \Omega_{in} + E_e \quad (27)$$

$$\Omega_{in} = (1/K_s) [\sin^{-1} \{(E_3 - E_e)/K_p \cdot K_m\}] \quad (28)$$

On the other hand, the causes of the electrical offset value $E_e$ were experimentally searched for. Then, it has been found that the causes are leakage to the side of the photodetector 40 attributed to the induction of the drive signal $E_1$ of the phase modulator 70 and the offset of the D.C. amplification portion of the synchronous detector 50a, and that the electrical offset is quite regardless of the magnitude of the light output.

On the basis of the above experimental results, the light output is set to zero, and the constant $K_p$ in Eq. (27) is set to zero, whereby Eq. (27) becomes:

$$E_3 = E_e \quad (29)$$

and the output $E_4$ of the A/D converter 50b usually has a value equal to the signal $E_3$. Therefore, the true electrical offset value $E_e$ containing also the offset value of the A/D converter 50b can be readily obtained in the processing portion 50c. In consequence, the input angular velocity $\Omega_{in}$ evaluated with Eq. (28) becomes precise, and the detection value $\Omega_{out}$ of small error can be finally delivered as the output.

Figure 17:
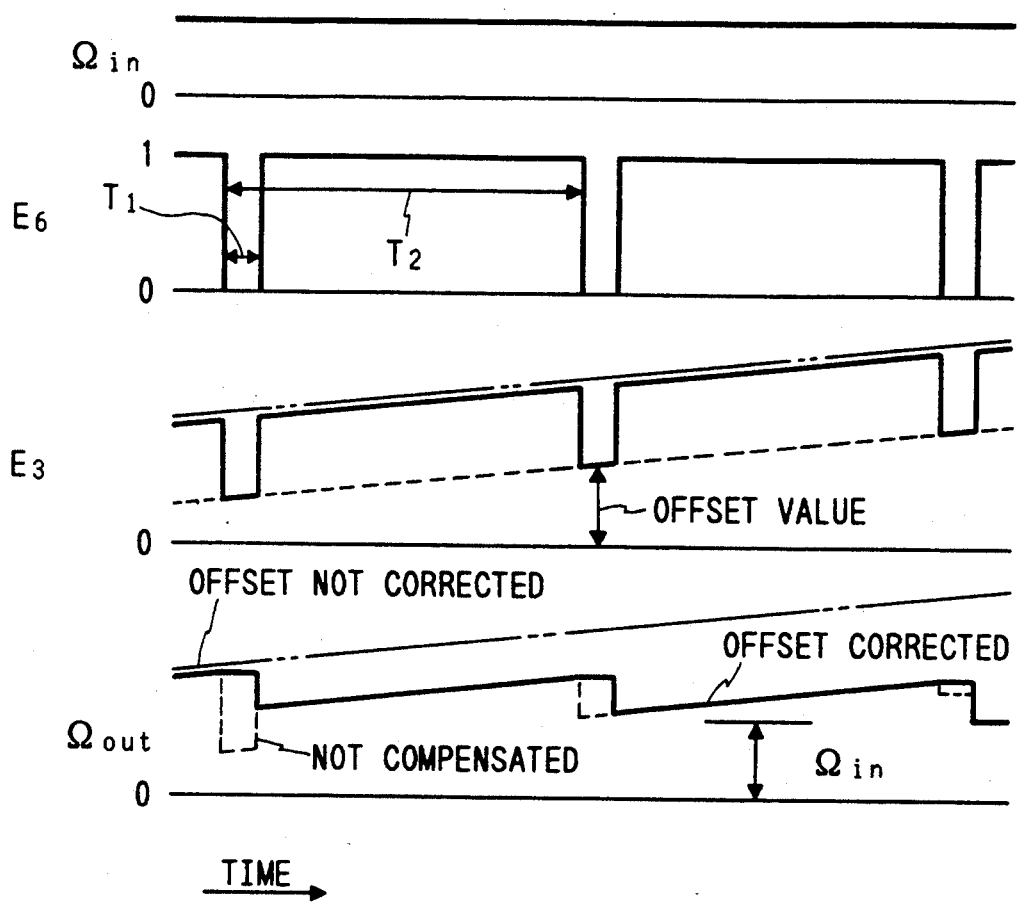
FIG. 17 is a diagram for explaining operations in a method of eliminating an offset.

Operations for realizing such a situation will be concretely described in conjunction with FIG. 16 referred to above and FIG. 17 showing an operating diagram.

Here, it is assumed that, as illustrated in FIG. 17, the input angular velocity $\Omega_{in}$ is constant, while the offset value increases rectilinearly with the lapse of time as indicated by a broken line. (Usually, the offset value fluctuates vibrating in accordance with fluctuations in the surroundings.)

First, the command signal $E_6$ is set to zero for a time interval $T_1$ at a period $T_2$. Then, while this command signal $E_6$ is at 1 (one), the switch 8 in FIG. 16 is "on" to hold the command value $E'_p$ at $E_p$ and to apply the D.C. signal $E_8$ to the coherent light source 10, so that the light output of the optical branching/coupling unit 60 becomes a predetermined value.

On the other hand, while the command signal $E_6$ is at zero (during the time interval $T_1$), the switch 8 is "off" to hold the command value $E'_p$ at zero, and the light output of the optical branching/coupling unit 60 becomes zero eventually. As indicated by a solid line in FIG. 17, accordingly, the output signal $E_3$ of the synchronous detector 50a is free from any fluctuating component ascribable to the input angular velocity $\Omega_{in}$, and the value thereof during the zero command signal $E_6$ consists only of the electrical offset value $E_e$.

This offset value is detected and stored by the processing portion 50c, and the offset value stored before is subtracted from the value of the output signal $E_3$ for the "1" command signal $E_6$, in the same processing portion 50c, to evaluate the input angular velocity $\Omega_{in}$, whereby an error ascribable to the offset contained in the detection value $\Omega_{out}$ is corrected. That is, the error of the detection value $\Omega_{out}$ becomes only the fluctuating component of the offset during the period $T_2$ and becomes a value nearly equal to the input angular velocity $\Omega_{in}$. From a different viewpoint, the optical fiber gyroscope of the present invention has the function that adjusting the detection value $\Omega_{out}$ to zero when the input angular velocity $\Omega_{in}$ is zero, namely, the zero-point control can be performed when the input angular velocity $\Omega_{in}$ is not zero. Moreover, from the viewpoint of a long-term operation, the zero-point control is periodically carried out, so that the offset and the drift can be equivalently made zero. However, while the command signal $E_6$ is zero, the detection of the input angular velocity $\Omega_{in}$ is quite impossible. Accordingly, there is no other way than delivering a value irrespective of the input angular velocity $\Omega_{in}$, for example, the offset value, and the detection value $\Omega_{out}$ has its error enlarged as indicated by a broken line in the figure.

Here, assuming that the input angular velocity $\Omega_{in}$ does not greatly change during the time interval $T_1$, it is effective that the detection value $\Omega_{out}$ for the time interval $T_1$ is held at a value immediately before the command signal $E_6$ is set at zero, whereupon it is compensated as indicated by a solid line. Inevitably, however, the detection is impossible during the time interval $T_1$. In a case where an angle is obtained by integrating the detection value $\Omega_{out}$, the longer time interval during which the detection is impossible forms a greater error factor. It is therefore recommendable to shorten the time interval $T_1$ to the utmost and to lengthen the period $T_2$ to the utmost.

By the way, in a case where the present invention is not performed, that is, where the offset is not corrected, the output signal $E_3$ of the synchronous detector 50a and the detection value $\Omega_{out}$ develop great errors due to the offset as indicated by two-dot chain lines in FIG. 17.

As thus far described, merely by adding one switch 8 to the prior-art device and contriving the arithmetic processing, this embodiment brings forth the effect of diminishing the offset and the drift for the optical fiber gyroscope, the effect of bestowing the function which permits the zero-point control to be carried out under the application of the input angular velocity, and the effect reducing the size and lightening the weight of the gyroscope because no mechanical reversal setup is included.

In FIG. 16, for the brevity of the description, only the drive signal $E_1$ and the synchronizing signal $E'_1$ are illustrated as the outputs of the signal generator 80, and the single synchronous detector 50a is illustrated. However, the present invention is not restricted to such an aspect, but it can also be performed in a signal processing system including a plurality of synchronous detectors.

In this regard, when the frequency of the synchronizing signal $E'_1$ is even times that of the drive signal $E_1$, Eq. (27) becomes:

$$E_3 = K_p \cdot K_m \cdot \cos K_s \Omega_{in} + E_e \qquad (30)$$

Thus, the output signal $E_3$ of the synchronous detector 50a is the maximum when the input angular velocity $\Omega_{in}$ is zero. However, it holds true that the electrical offset value is found by setting the constant $K_p$ to zero, and the effect of diminishing the offset and the drift (in this case, the output fluctuation) is quite the same as in the embodiment stated above.

Also, in FIG. 16, the current controller 11a monitors the light output of the optical branching/coupling unit 60 and controls the light output so as to be constant, but this aspect is not restrictive. By way of example, the light output of the coherent light source 10 may well be directly monitored, or the drive current of the coherent light source 10 may well be monitored so as to keep it constant. In this case, the effects of the embodiment are held.

Besides, in the above, it has been described that the coherent light source 10 is temporarily turned "off" to make the constant $K_p$ of Eq. (27) zero, thereby to hold:

$$K_p \cdot K_m \cdot \sin K_s \Omega_{in} = 0 \qquad (31)$$

However, the constant $K_m$ concerning the degree of the A.C.-wise light phase difference bias may well be temporarily set to zero. A practicable expedient therefor will be described. Although no obstacle is formed by making both the constants $K_p$ and $K_m$ zero, either may be set to zero. It is allowed that the switch 8 shown in FIG. 16 is shifted to the side of the phase modulator 70 so as to turn "on" and "off" the drive signal $E_1$, while the current controller 11a is directly supplied with the command value $E_p$. Even with such a construction, the effects of the embodiment are held.

In addition, any expedient may be employed for turning "on" and "off" the drive signal $E_1$. By way of example, the oscillation of the drive signal $E_1$ may well be stopped by directly sending the command signal $E_6$ to the signal generator 80, without employing the switch 8. As an extreme example therefor, the signal generator 80 may well be included in the processing portion 50c in built-in fashion. In this case, the effect of a simplified construction is added to the effects of the embodiment stated before.

Besides, the electrical offset value $E_e$ can be found in such a way that the drive signal $E_1$ of the phase modulator 70 has its sign temporarily inverted by an analog switch or the like without being turned "off", that a D.C. signal $E'_3$ at that time is stored, that the stored value and the D.C. signal $E_3$ without the above inversion are added, and that the sum is divided by 2. More specifically, the value of the constant $K_m$ in Eq. (27) is temporarily set at $-K_m$, and the addition is executed. Then, the following holds:

$$\begin{aligned} E_3 + E'_3 &= K_p \cdot K_m \cdot \sin K_s \Omega_{in} + E_e + \\ & \quad E_p \cdot (-K_m) \cdot \sin K_s \Omega_{in} + E_e \\ &= 2 E_e \end{aligned} \qquad (32)$$

$$(E_3 + E'_3)/2 = E_e \qquad (33)$$

Thus, the offset value $E_e$ can be found. This value is subtracted from the D.C. signal $E_3$ during the normalcy, whereby the offset can be corrected. With this embodiment, the input angular velocity $\Omega_{in}$ cannot be detected only for a short time interval (corresponding to the dead time of the switch) during which the sign of the drive signal $E_1$ is being inverted. This time interval is on the order of 1/10–1/100 of the corresponding time interval in the foregoing embodiment in which the drive source is turned "off". Accordingly, the embodiment brings forth the effect of minimizing the error of the detection value $\Omega_{out}$ during the time interval during which the input angular velocity $\Omega_{in}$ cannot be detected.

Figure 18:
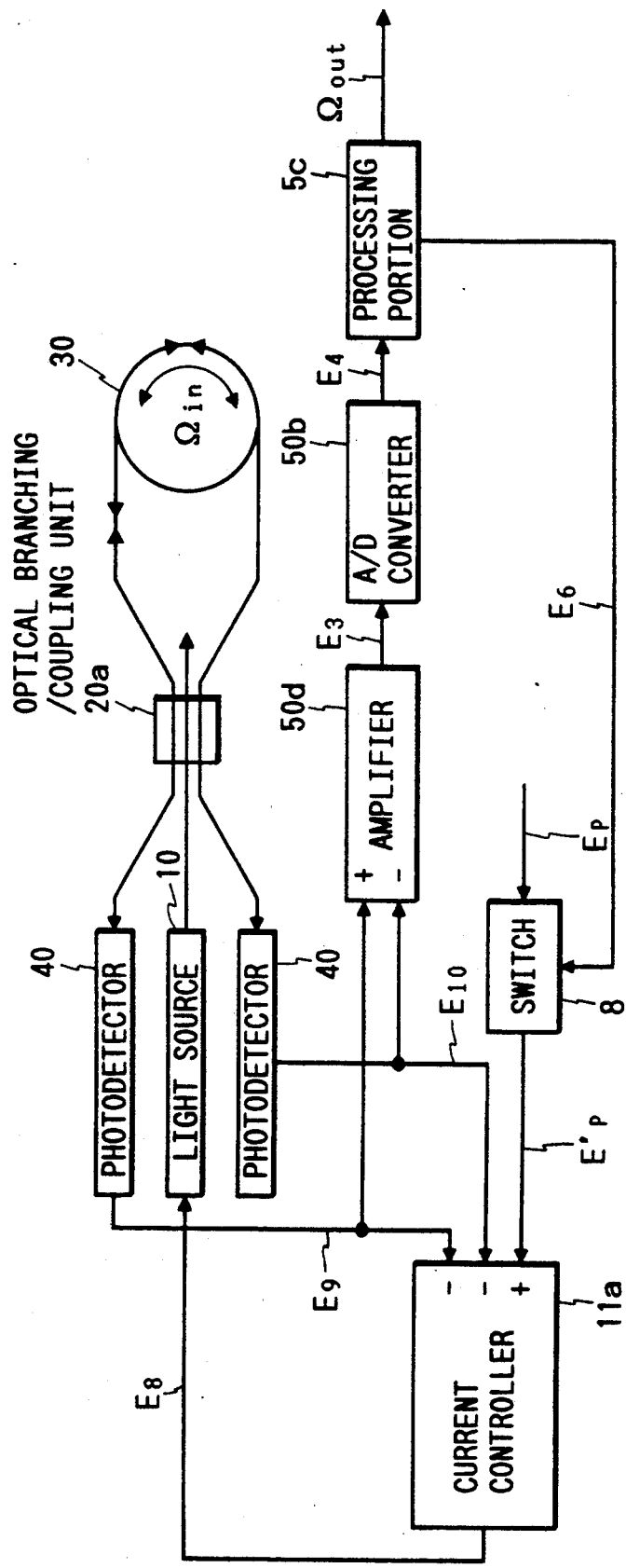
FIG. 18 shows the eleventh embodiment of the optical fiber gyroscope of the present invention.

Now, there will be described a case of performing the present invention in an optical fiber gyroscope in which the light phase difference bias means of an optical system is D.C.-wise. FIG. 18 is a block diagram in the case of applying the present invention to the optical fiber gyroscope of phase difference bias type in which a 3×3 photobrancher is used as an optical branching/coupling unit 20a. In the figure, components indicated by the same symbols as in FIG. 16 are identical to those shown in FIG. 16, and they shall be omitted from description here. The other components will be described. First, the optical branching/coupling unit 20a is the 3×3 photobrancher as stated above. It has three input nodes and three output nodes. It bifurcates the light output of the coherent light source 10, puts the resulting light beams into the optical fiber loop 30, bestows light phase difference biases on the light waves circulated through the optical fiber loop 30 clockwise and counterclockwise and then synthesizes them, and delivers light outputs from two of the output nodes. Ideally, the magnitude of the light phase difference biases becomes ¼ wavelength. The current controller 11a compares the command value $E'_p$ with the sum value of the respective output values $E_9$ and $E_{10}$ of the photodetectors 40, and regulates the D.C. signal $E_8$ so as to hold the sum value of the output signals $E_9$ and $E_{10}$ constant. An amplifier 50d is a D.C. amplifier which amplifies the difference between the output signals $E_9$ and $E_{10}$. In such a construction, assuming the light phase difference bias magnitude to be ¼ wavelength (90° in terms of a light phase difference), the formulae of the relations of the output signals $E_9$, $E_{10}$ and $E_3$ with the input angular velocity $\Omega_{in}$ become as follows:

$$E_9 = K_p (1 + \sin K_s \Omega_{in}) + E_{e1} \qquad (34)$$

$$E_{10} = K_p (1 - \sin K_s \Omega_{in}) + E_{e2} \qquad (35)$$

$$\begin{aligned} E_3 &= K_g (E_9 - E_{10}) = K_g (2 K_p \sin K_s \Omega_{in}) + K_g \\ & \quad (E_{e1} - E_{e2}) + E_{e3} \end{aligned} \qquad (36)$$

$$\Omega_{in} = (1/K_s) [\sin^{-1}\{(E_3 - K_g (E_{e1} - E_{e2}) - E_{e3})/2 K_p K_g\}] \qquad (37)$$

$$E_z = E_9 + E_{10} = 2 K_p + E_{e1} + E_{e2} \qquad (38)$$

Here, $K_p$ denotes a constant which relates to the magnitude of the light output entering each photodetector 40 and the gain of each photodetector 40, $K_s$ a constant which relates to the sensitivity of the optical system, $K_g$ a constant which relates to the gain of the amplifier 50d, $E_{e1}$ and $E_{e2}$ the offset values of the photodetectors 40, and $E_{e3}$ the offset value of the amplifier 50d.

First, as indicated by Eq. (38), the sum $E_z$ of the output signals $E_9$ and $E_{10}$ becomes a value regardless of the magnitude of the input angular velocity $\Omega_{in}$ and proportional to the light outputs when the offset values $E_{e1}$, $E_{e2}$ are ignored. Therefore, the light outputs circulated through the optical fiber loop 30 can be held constant in such a way that the command signal $E_6$ is set to 1 (one), while the switch 8 is turned "on" to deliver the value $E_p$ as the command value $E'_p$, and that the current controller 11a compares the command value $E'_p$ and the sum value $E_z$ and finely adjusts the D.C. signal $E_8$ so as to keep the value $E_z$ constant.

Next, as described in detail concerning the embodiment shown in FIG. 16, the command signal $E_6$ is set to zero to turn "off" the switch 8, and the light output of the coherent light source 10 is set to zero to render the constant $K_p$ zero, whereby the offset value $K_g$ ($E_{e1} - E_{e2}$) + $E_{e3}$ can be obtained as indicated in Eq. (36). As a result, the input angular velocity $\Omega_{in}$ evaluated with Eq. (37) becomes a precise value which is not affected by the electrical offset. Eventually, the detection value $\Omega_{out}$ whose offset and drift are small can be delivered as an output. Here, the offset values $E_{e1}$ and $E_{e2}$ are ignored in Eq. (38), whereas the offset value $K_g$ ($E_{e1} - E_{e2}$) + $E_{e3}$ is taken into account in Eq. (36). The reason therefor is that the constant $K_g$ is an amplification factor of 50-100 times, so the offset is amplified and enlarged. Incidentally, when it is assumed that the input angular velocity $\Omega_{in}$ is constant and that the offset value increases rectilinearly with the lapse of time, the operating situation of this embodiment is quite the same as the operation of the preceding embodiment and is as illustrated in FIG. 17.

In this embodiment, in a case where the light phase difference bias magnitude does not exactly meet ¼ wavelength, a term of cos $K_s \Omega_{in}$ appears in Eqs. (34) and (35), and it becomes an optical offset value which cannot be corrected in this embodiment. Moreover, the relationship of proportionality between the input angular velocity $\Omega_{in}$ and the detection value $\Omega_{out}$ collapses. It is therefore important to bring the light phase difference bias magnitude exactly to ¼ wavelength. Meanwhile, the constant $K_p$ in Eq. (34) and the constant $K_p$ in Eq. (35) come to disagree due to the magnitude of the light output, the discrepancy between the gains of both the photodetectors 40, etc. As a result, an offset value which cannot be distinguished from an optical one develops. Moreover, a term of sin $K_s \Omega_{in}$ appears in Eq. (38), and the light output of the coherent light source 10 fails to be held constant. For validating this embodiment, therefore, it is important to finely adjust the gains of the photodetectors 40, etc.

As thus far described, the effects of this embodiment hardly differ from those of the embodiment shown in FIG. 16 even when the optical system of the optical fiber gyroscope to be handled is of the D.C.-wise light phase difference bias type.

In addition, the optical system to be handled is not restricted to the foregoing ones, but it may well be of a so-called orthogonal polarized-wave type which affords a light phase difference bias D.C.-wise with a quarter-wave plate likewise to the optical system shown in FIG. 18. The effects of such an embodiment are the same as those of the embodiment shown in FIG. 18.

Besides, according to the operating aspect in FIG. 17, the command signal $E_6$ is periodically set to zero, but this is assumed for better understanding of the invention. In actuality, offset corrections may be made by setting the command signal $E_6$ to zero at need. Considering the fact that the time interval $T_1$ for detecting the offset value is the time interval during which the input angular velocity $\Omega_{in}$ cannot be detected, it is also a good method to make the offset correction when, by way of example, the detection value $\Omega_{out}$ is small and constant.

Also, in each of FIGS. 16 and 18, the portions for bringing the command value $E'_p$ to the value $E_p$ or zero by means of the switch 8 are not restrictive, but the command signal $E_6$ may well be directly applied to the current controller 11a through an attenuator or the like by way of example. In this case, there is the effect of a simplified construction.

Also, in the foregoing embodiments, the electrical offset value is detected by setting either the constant $K_p$ or the constant $K_m$ to zero. However, the electrical offset value may well be numerically calculated from the variation magnitude of the output signal $E_3$ developing when, for example, the constant $K_p$ is set to ½.

Figure 19:
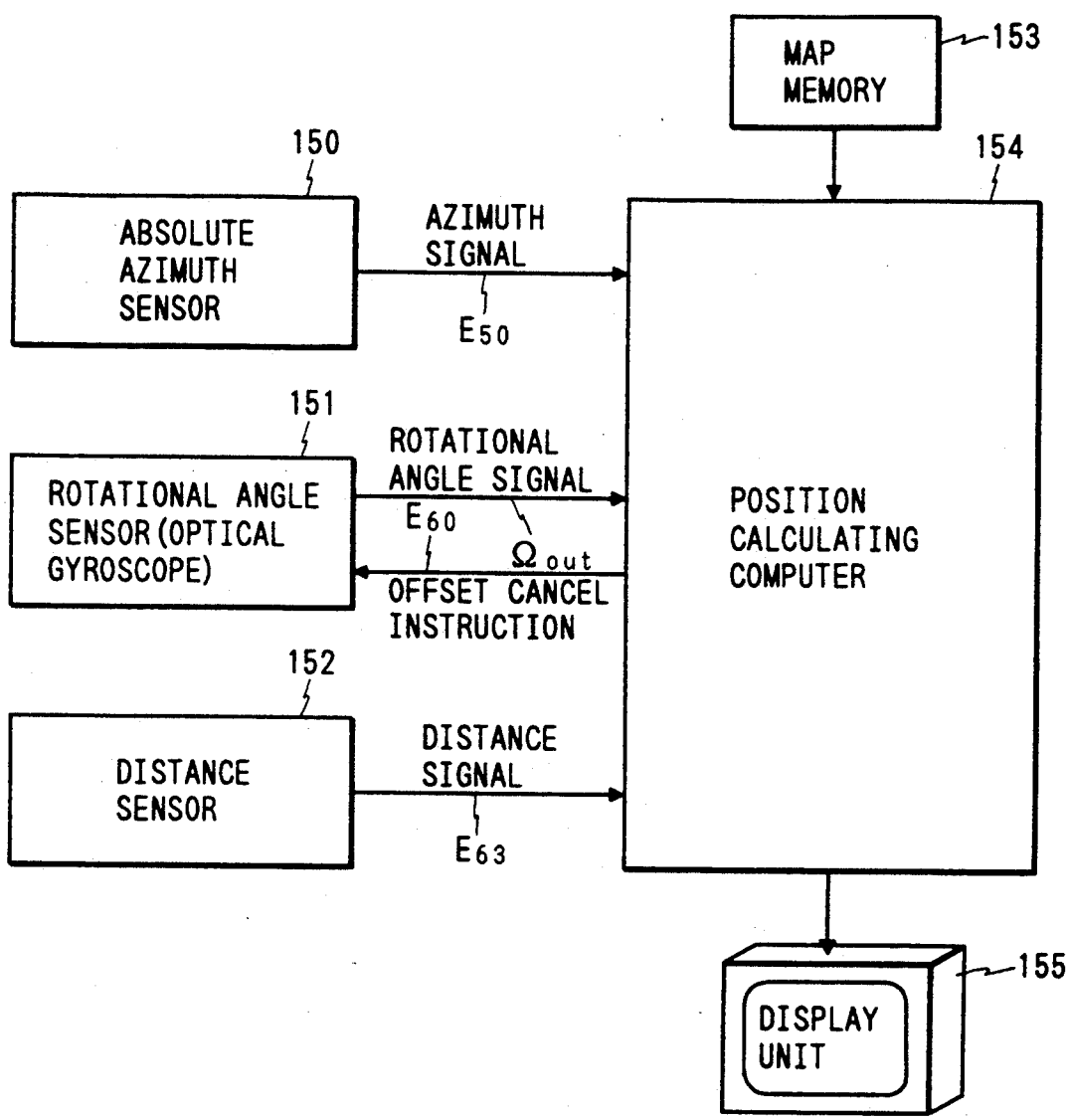
FIG. 19 is a block diagram of a navigation system employing the optical fiber gyroscope of the present invention.

Now, an embodiment in which the optical fiber gyroscope is applied to a navigation system is shown in FIG. 19. The relative rotational angle of a vehicle can be detected at high accuracy by the use of the detection value $\Omega_{out}$ of the optical fiber gyroscope 151 of the present invention. Further, the position of the vehicle can be calculated in a position calculating computer 154 which is a main control device, using an azimuth signal $E_{50}$ from an absolute azimuth sensor 150 and a distance signal $E_{63}$ from a distance sensor 152. The calculated result can be indicated on a display unit 155 by the use of the road data of a map memory 153.

In this system, an offset cancel command $E_{60}$ for correcting the offset of the optical fiber gyroscope is generated by the position calculating computer 154. This position calculating computer 154 decides the state of the moving object, and generates the offset cancel command $E_{60}$. The optimum states in which the signal $E_{60}$ is generated, are as follows:

(1) State in which the vehicle is at a stop.
(2) State in which the input angular velocity is low, and the vehicle is under or near rectilinear running.
(3) State in which the vehicle is rotating at a constant angular velocity.

The offset cancel command $E_{60}$ from the position calculating computer 154 is sent to the optical fiber gyroscope 151 as stated above, and the command signal $E_6$ is generated in the optical fiber gyroscope 151. Thus, the offset of the angular velocity having been stored till then can be canceled, and the navigation system of higher accuracy can be realized.

As described above, according to the present invention, it is possible to realize an optical fiber gyroscope which is small in size and light in weight because no mechanical reversal setup is employed, and whose offset and drift are small because the offset is corrected. Further, in case of applying the optical fiber gyroscope to a navigation system, an offset cancel command is generated by the main control device of the system, whereby corrections conforming to the situation of a moving object can be made, and the navigation system of high accuracy can be realized.

We claim:

1. In an optical fiber gyroscope having an optical branching/coupling unit in which light from a coherent light source is bifurcated or conjoined in two directions, an optical system which includes an optical fiber loop for propagating bifurcated light beams in terms of reverse rotations, as well as light phase difference bias means for affording a bias to the bifurcated light beams, a signal processing system which converts an optical output of the optical system into an electric signal and processes the electric signal, and detection means for detecting an angular velocity on the basis of a processed result of the signal processing system;

an optical fiber gyroscope characterized in that said optical branching/coupling unit has waveguide paths of the transmitted light and the branched light which are asymmetrically structured and develops a predetermined light phase difference between transmitted light and branched light, thereby to function also as said means for affording the light phase bias.

2. An optical fiber gyroscope as defined in claim 1, wherein said optical branching/coupling unit develops the light phase difference which affords $\pi/2$ as the phase bias.

3. An optical fiber gyroscope as defined in claim 1, comprising means for measuring an intensity of the branched light of said optical branching/coupling unit, and means for controlling an intensity of a light source of said light system in accordance with the measured intensity of the branched light so as to keep constant a quantity of light entering a path to said optical branching/coupling unit.

4. An optical fiber gyroscope as defined in claim 1, comprising optical phase modulation means interposed between said optical fiber loop and said optical branching/coupling unit, and means for driving said optical phase modulation means and for compensating an intensity fluctuation of interference light by the use of a peak value of the interference light obtained.

5. An optical fiber gyroscope as defined in claim 1, comprising means for subjecting interference light which is formed of the beams of light-to-interfere endowed with the light phase bias and which is derived from a terminal of said optical branching/coupling unit and feedback light of said optical fiber loop which is derived from another terminal of said optical branching/coupling unit, to predetermined processing based on phase characteristics of said optical branching/coupling unit, and for generating a composite signal which varies as a sine function in correspondence with the phase difference between the beams of light-to-interfere in said optical fiber loop.

6. An optical fiber gyroscope as defined in claim 2, wherein said optical branching/coupling unit includes a plurality of optical fibers which have been melted and stretched under different stretching conditions.

7. An optical fiber gyroscope as defined in claim 2, wherein said optical branching/coupling unit includes a plurality of polarization plane conserving fibers which give rise to different polarization modes of optical branching/coupling.

8. An optical fiber gyroscope as defined in claim 1, wherein said optical branching/coupling unit includes an optical integrated circuit or polarization plane conserving fibers.

9. An optical fiber gyroscope as defined in claim 8, wherein an optical branching/coupling portion of said optical integrated circuit is provided with electrodes which serve to apply a voltage for adjusting the light phase difference between the transmitted light and the branched light.

10. An optical fiber gyroscope as defined in claim 1, comprising a thermal buffer box which envelops said optical fiber loop, and a spool for said optical fiber loop.

11. An optical fiber gyroscope as defined in claim 9, wherein said thermal buffer box includes a heat insulator.

12. An optical fiber gyroscope as defined in claim 10, wherein said thermal buffer box includes a multilayer structure which is made of a heat insulator and a thermal conductor.

13. An optical fiber gyroscope as defined in claim 12, wherein said spool for said optical fiber loop has a high thermal conductivity and a low thermal expansibility.

14. An optical fiber gyroscope as defined in claim 13, wherein said thermal buffer box has a white or specular surface.

15. An optical fiber gyroscope having an optical branching/coupling unit in which light from a coherent light source is bifurcated or conjoined in two directions, an optical system which includes an optical fiber loop for propagating bifurcated light beams in terms of reverse rotations, as well as light phase difference bias means for affording a bias to the bifurcated light beams, a signal processing system which converts an optical output of the optical system into an electric signal and processes the electric signal, and detection means for detecting an angular velocity on the basis of a processed result of the signal processing system;

an optical fiber gyroscope characterized in that said optical branching/coupling unit develops a predetermined light phase difference between transmitted light and branched light, thereby to function also as said means for affording the light phase bias;

comprising optical phase modulation means interposed between said optical fiber loop and said optical branching/coupling unit, and means for driving said optical phase modulation means and for compensating an intensity fluctuation of interference light by the use of a peak value of the interference light obtained;

and further comprising buffers which are respectively interposed between the optical phase modulator and mounting portions for said optical phase modulator.

16. An optical fiber gyroscope as defined in claim 15, wherein that part of said each buffer which is held between said optical phase modulator and said mounting portion is in the shape of rods made of rubber.

17. An optical fiber gyroscope as defined in claim 16, comprising a thermal buffer box which envelops said optical fiber loop, said optical phase modulator and said buffers.

18. An optical fiber gyroscope having an optical branching/coupling unit in which light from a coherent light source is bifurcated or conjoined in two directions, an optical system which includes an optical fiber loop for propagating bifurcated light beams in terms of reverse rotations, as well as light phase difference bias means for affording a bias to the bifurcated light beams, a signal processing system which converts an optical output of the optical system into an electric signal and processes the electric signal, and detection means for detecting an angular velocity on the basis of a processed result of the signal processing system;

an optical fiber gyroscope characterized in that said optical branching/coupling unit develops a predetermined light phase difference between transmitted light and branched light, thereby to function also as said means for affording the light phase bias; comprising means for bringing said coherent light source into an oscillation suspension state for a moment in a period shorter than a propagation delay time in which the light emergent from said light source is fed back to aid light source after propagating through said optical fiber loop.

19. An optical fiber gyroscope having an optical branching/coupling unit in which light from a coherent light source is bifurcated or conjoined in two directions, an optical system which includes an optical fiber loop for propagating bifurcated light beams in terms of reverse rotations, as well as light phase difference bias means for affording a bias to the bifurcated light beams, a signal processing system which converts an optical output of the optical system into an electric signal and processes the electric signal, and detection means for detecting an angular velocity on the basis of a processed result of the signal processing system;

an optical fiber gyroscope characterized in that said optical branching/coupling unit develops a predetermined light phase difference between transmitted light and branched light, thereby to function also as said means for affording the light phase bias; comprising memory means for storing as an offset value an output signal of said signal processing system delivered when said coherent light source is temporarily turned "off", and detection means for correcting with the offset value an output signal delivered when said coherent light source is "on".

20. An optical fiber gyroscope as defined in claim 19, wherein said detection means holds an output signal of said signal processing system during an "off" time interval of said coherent light source, at a value presented immediately before said coherent light source is turned "off".

21. An optical fiber gyroscope as defined in claim 19, wherein said light phase difference bias means is a phase modulator which is driven by an A.C. voltage of predetermined frequency.

22. In a navigation system having a rotational angle sensor which detects a rotational angle of a moving object, a distance sensor which detects a movement distance, an azimuth sensor which detects an absolute direction, a main control device which includes information record means for recording map information, as well as calculation means for evaluation a present position of the moving object on the basis of the outputs of the sensors and the map information, and display means for displaying the present position;

a navigation system characterized in that said rotational angle sensor is comprised of an optical branching/coupling unit affording a predetermined phase bias, and in that said main control device includes means for judging a state of the moving object and means for issuing an offset cancel command for said optical fiber gyroscope on the basis of a judged result thereof.

23. In an optical fiber gyroscope having an optical branching/coupling unit in which light from a coherent light source is bifurcated or conjoined in two directions, an optical system which includes an optical fiber loop for propagating bifurcated light beams in terms of reverse rotations, as well as light phase difference bias means for affording a bias to the bifurcated light beams, a signal processing system which converts an optical output of the optical system into an electric signal and processes the electric signal, detection means for detecting an angular velocity on the basis of a processed result of the signal processing system, a thermal buffer box which envelops said optical fiber loop, and a spool for said optical fiber loop, wherein an inner wall of said thermal buffer box and the spool for said optical fiber loop are connected only to a heat insulator.

24. An optical fiber gyroscope as defined in claim 23, wherein said thermal buffer box includes a multilayer structure which is made of a heat insulator and a thermal conductor.

25. An optical fiber gyroscope as defined in claim 24, wherein said spool for said optical fiber loop has a high thermal conductivity and a low thermal expansibility.

26. An optical fiber gyroscope as defined in claim 25, wherein said thermal buffer box has a white or specular surface.

* * * * *